US006768981B2

(12) United States Patent
Patterson, Jr. et al.

(10) Patent No.: US 6,768,981 B2
(45) Date of Patent: Jul. 27, 2004

(54) METHOD FOR EXECUTING A CROSS-TRADE IN A TWO-WAY WIRELESS SYSTEM

(75) Inventors: L. Thomas Patterson, Jr., Chatham, NJ (US); Desmond Sean O'Neill, Norwalk, CT (US); Stephen Tyler Carroll, Chatham, NJ (US)

(73) Assignee: Papyrus Corporation, New York, NY (US)

( * ) Notice: Subject to any disclaimer, the term of this patent is extended or adjusted under 35 U.S.C. 154(b) by 85 days.

(21) Appl. No.: 10/210,301

(22) Filed: Aug. 1, 2002

(65) Prior Publication Data

US 2002/0198813 A1 Dec. 26, 2002

Related U.S. Application Data

(63) Continuation of application No. 09/668,184, filed on Sep. 22, 2000, which is a continuation of application No. 09/193,089, filed on Nov. 16, 1998, now abandoned, which is a continuation of application No. 09/028,216, filed on Feb. 23, 1998, now Pat. No. 5,915,245, which is a continuation of application No. 08/478,286, filed on Jun. 7, 1995, now Pat. No. 5,797,002, which is a continuation-in-part of application No. 08/309,337, filed on Sep. 20, 1994, now Pat. No. 5,774,877.

(51) Int. Cl.[7] .............................................. G06F 17/60
(52) U.S. Cl. ............................ 705/36; 705/37; 705/36; 705/35; 395/209; 395/674; 395/675
(58) Field of Search ............................. 705/37, 35, 36; 707/100; 485/31.2; 709/707; 395/209–237, 674, 675

(56) References Cited

U.S. PATENT DOCUMENTS

| 3,573,747 A | 4/1971 | Adams et al. |
| 4,336,524 A | 6/1982 | Levine ................. 340/825.44 |
| 4,412,287 A | 10/1983 | Braddock, III |
| 4,473,824 A | 9/1984 | Claytor |
| 4,617,423 A | 10/1986 | Dickerson et al. |
| 4,674,044 A | 6/1987 | Kalmus et al. |
| 4,677,434 A | 6/1987 | Fascenda |

(List continued on next page.)

FOREIGN PATENT DOCUMENTS

| EP | 388162 A2 | 9/1990 |
| EP | 388162 A3 | 9/1990 |
| WO | WO 01/26003 | * 4/2001 |

OTHER PUBLICATIONS

"Options Exchange Using Wireless Terminals" (NPL), American Banker, Nov. 1994.*

(List continued on next page.)

Primary Examiner—Jeffrey Pwu
(74) Attorney, Agent, or Firm—Darby & Darby

(57) ABSTRACT

A method for executing a cross-trade. The method includes the steps of receiving at a computer carried by a floor broker a sell order for execution, the sell order concerning an instrument and including a first set of terms and also a buy order for execution, the buy order concerning the instrument and having a second set of terms which is compatible with the first set of terms. The method permits the floor broker to cross at least a portion of the buy order with the sell order using the computer and to selectively transmit to a remote computer the crossed portion of the buy and sell orders. As a result, a cross-trade is reported to the remote computer and executed.

20 Claims, 17 Drawing Sheets

U.S. PATENT DOCUMENTS

| | | | |
|---|---|---|---|
| 4,677,552 A | 6/1987 | Sibley, Jr. | |
| 4,700,295 A | 10/1987 | Katsof et al. | 364/401 |
| 4,734,858 A | 3/1988 | Schlafly | |
| 4,740,788 A | 4/1988 | Konneker | 340/825.44 |
| 4,799,215 A | 1/1989 | Suzuki | |
| 4,903,201 A * | 2/1990 | Wagner | 705/37 |
| 4,937,743 A | 6/1990 | Rassman et al. | 395/208 |
| 4,940,963 A | 7/1990 | Gutman et al. | 340/825.44 |
| 4,980,826 A * | 12/1990 | Wagner | 705/37 |
| 5,003,473 A | 3/1991 | Richards | |
| 5,045,848 A | 9/1991 | Fascenda | |
| 5,090,024 A | 2/1992 | Vander Mey et al. | |
| 5,099,431 A | 3/1992 | Nafarajan | 395/208 |
| 5,111,391 A | 5/1992 | Fields et al. | 395/209 |
| 5,153,582 A | 10/1992 | Davis | 340/825.44 |
| 5,168,446 A | 12/1992 | Wiseman | |
| 5,231,634 A | 7/1993 | Giles et al. | |
| 5,265,006 A | 11/1993 | Asthana et al. | 395/208 |
| 5,270,919 A | 12/1993 | Blake et al. | 395/208 |
| 5,270,922 A | 12/1993 | Higgins | |
| 5,278,984 A | 1/1994 | Batchelor | 395/650 |
| 5,285,506 A | 2/1994 | Crooks et al. | 382/189 |
| 5,295,154 A | 3/1994 | Meier et al. | |
| 5,297,031 A * | 3/1994 | Gutterman et al. | 705/37 |
| 5,297,032 A | 3/1994 | Trojan et al. | |
| 5,307,297 A | 4/1994 | Iguchi et al. | 345/709.11 |
| 5,309,437 A | 5/1994 | Perlman et al. | |
| 5,310,997 A | 5/1994 | Roach et al. | |
| 5,311,423 A | 5/1994 | Clark | 344/401 |
| 5,315,634 A * | 5/1994 | Tanaka et al. | 379/93.02 |
| 5,325,292 A | 6/1994 | Crockett | 364/401 |
| 5,343,387 A | 8/1994 | Honma et al. | 364/401 |
| 5,345,049 A | 9/1994 | Bahjat et al. | 187/127 |
| 5,347,477 A | 9/1994 | Lee | 364/709.11 |
| 5,369,570 A | 11/1994 | Parad | 395/208 |
| 5,459,458 A | 10/1995 | Richardson et al. | 340/825.44 |
| 5,459,837 A | 10/1995 | Caccavale | 395/184.01 |
| 5,467,268 A | 11/1995 | Sisley et al. | 395/209 |
| 5,530,438 A | 6/1996 | Bickham et al. | 340/825.34 |
| 5,559,878 A | 9/1996 | Keys et al. | 379/265 |
| 5,561,446 A | 10/1996 | Montlick | 345/173 |
| 5,608,907 A | 3/1997 | Fehskens et al. | 395/672 |
| 5,615,121 A | 3/1997 | Babayev et al. | 395/209 |
| 5,619,655 A | 4/1997 | Weng et al. | 395/670 |
| 5,634,100 A | 5/1997 | Capps | 395/209 |

OTHER PUBLICATIONS

"Technology Outruns Even the Runners On Wall Street: Electronic Trading to Replace Hand–Carried Messages on the Floor of Big Board," by Dave Pettit—The Wall Street Journal, Aug. 19, 1994.

"Frontlines: Hand–held Price Reporting Systerm Launched"—Wall Street & Technology, vol. 10, No. 4., p. 14.

"A Handheld Computer That's Combat–Hardened" by Greg burns—Business Week, Apr. 18, 1994, p. 94, 96.

"Tossing Out Tickets" by Carrie R. Smith—Wall Street & Technology, Vo. 11, No. 13, pp. 52–53, 55–56, 58.

Report of the Presidential Task Force on Market Mechanisms—Jan. 1988, Table of Contents and pp. i, VI–14, VI–14.

Is the Pen Mightier Than The Phone?, by Jenna Michaels dated Sep. 1991, Wall Street Computer Review, 2 pp.

"The Specialist At the New York Stock Exchange: Auctioneer Catalyst Agent Principal", 11 page pamphlet.

"Off–Exchange Trading Chips Away at NYSE Volume," by Ivy Schmerken, Wall Street & Technology, vol. 10, No. 4, pp. 42–44, 46–48.

"WordPerfect Office Reference for IBM Personal Computers and PC Networks", Table of Contents and pp. 495–500, 513–515, 557–560.

"LANs Explained A Guide to Local Area Networks," by W. Scott Currie, Chapter 11, pp. 122–133 and Table of Contents.

Wall Street Letter, Jun. 20, 1994, p. 6.

Wall Street Letter, Mar. 1, 1993, p. 7.

Wall Street Letter, Oct. 12, 1992, p. 7.

* cited by examiner

METHOD FOR EXECUTING A CROSS-TRADE IN A TWO-WAY WIRELESS SYSTEM

CROSS-REFERENCE TO RELATED CASES

This is a continuation of application Ser. No. 09/668,184, filed Sep. 22, 2000; which is a continuation of application Ser. No. 09/193,089, filed Nov. 16, 1998, now abandoned; which is a continuation of application Ser. No. 09/028,216, filed Feb. 23, 1998 now U.S. Pat. No. 5,915,245; which is a continuation of application Ser. No. 08/478,286, filed Jun. 7, 1995 now U.S. Pat. No. 5,797,002; which is a Continuation-in-part of application Ser. No. 08/309,337, filed Sep. 20, 1994 now U.S. Pat. No. 5,774,877. Each of these prior applications is hereby incorporated herein by reference, in its entirety.

FIELD OF THE INVENTION

The present invention relates to computer-based techniques for transferring orders, quotes, and memos from a remote location to a floor broker on the floor of a financial exchange.

BACKGROUND OF THE INVENTION

At present, there exist several types of financial markets in which securities, commodities, and other negotiable instruments are traded. Among known types of financial markets is the auction market, the most prominent example being the New York Stock Exchange. In an auction market, buyers and sellers congregate on the exchange floor and announce their respective bid (price offered to buy) and ask (price acceptable to sell) prices. As a result of the continuous auction process, a trade in any particular security occurs at the highest price any buyer is willing to pay and at the lowest price any seller is willing to accept. Transaction costs are minimized by eliminating dealers who otherwise come between the buyer and seller as in other types of exchanges, for example, the over-the-counter exchange.

The physical auction floor is divided into several rooms, each of which has posts or columns around which trading panels are arranged. The trading panels are where particular securities are designated to be traded. Each security is traded at a certain trading panel.

There are three principal players in the trading crowd on the floor of an auction exchange: the specialist, the floor broker, and the floor trader. The specialist is situated at one of the trading panels and has several roles in the trading process including: auctioneer to call out the best bids and offers to brokers that request quotes during the trading session and to ensure that all trades are posted; catalyst to call a particular broker who has previously expressed a buying interest to the post in response to a selling interest at the post; agent to represent investors in trades that have limits imposed thereon, for example, a price floor, etc.; and franchiser to provide capital when necessary to maintain liquidity when supply and demand are out of balance. See, "The Specialist At The New York Stock Exchange: Auctioneer, Catalyst, Agent, Principal," The Specialist Association (1994). The floor broker roams about the trading floor, and, as an agent, transacts orders on behalf of the buyers and sellers. Approximately ninety percent of the orders that the floor broker executes are obtained from a clerk who is situated on the perimeter of the exchange. The floor trader is like a floor broker, except the floor trader trades for his or her own account. For further information on the stock market and current automation thereof, see: "Stock Market," The Report of The Presidential Task Force, part VI, pp. 4–14, January (1988).

The clerk is not part of the trading crowd, but he or she plays a role in investor transactions. The clerk receives orders and quote requests from investors and relays them to one of the floor brokers for handling. Once handled, the clerk reports the execution or quote to the investor. Alternatively, the order can be electronically routed to the trading post for matching and reporting. As used in this specification, an investor is an order originator which may include institutions such as banks and pension funds, other broker/dealers, trading desks (institutional, retail, arbitrage, etc.), public customers (including individuals), and the like.

A typical transaction originates when an order is placed with an off-the-floor trading desk to buy or sell a particular security. The trading desk may either convey the order to a clerk (electronically or by telephone), or electronically to the specialist at the trading post. The clerk is known as the "order" or "booth clerk." The booth clerk notes the parameters of the order, for example, the side of the transaction (buy or sell), the symbol of the security (e.g., IBM, GM, etc.), the quantity (e.g., 9,000 shares), the price (market or limit), any special conditions (e.g., all or none, fill or kill, good 'till canceled, on opening, etc.), and the time that the order is placed. Because the market in any one security fluctuates with each trade and is influenced by the activity in other securities, an important aspect of the clerk's function is to ensure that the order is delivered to the broker so that it is executed in a timely fashion. An executed order is one that is filled or partially filled, that is, the security is bought or sold according to the parameters of the order.

The investor may also request that the trading desk obtain a quote from the floor of the exchange to get the "feel" of what is happening in the market of a particular security. Unlike an official quote provided by the quotation services such as ADP and Quotron, which includes the best bid and ask prices, the market size at the best prices, and perhaps opening and closing prices on the day for the stock as well as the last trade, this quote provides more insight or "flavor" into the market. By way of illustration, and not exhaustive of the possible varieties of "flavor quotes" obtainable, the "flavor quote" or "market look" may indicate: (1) who were the recent buyers and sellers of the security and the size and price of those trades; (2) the market depth (the extent of market interest) and who are the players at the current market and at differing price levels, as obtained from the trading crowd and perhaps the specialist's book; (3) the learned opinion and interpretation of the market from the floor brokers themselves; and (4) the possible trading interest of people not currently in the trading crowd, based on prior history, previous days, etc. The trading crowd, which includes the specialist who makes the market in that security and the other floor brokers and floor traders that may be working that post, provides a view of the market not obtainable from an official quote. Using the information obtained from the trading crowd and the floor broker's experience and understanding, the investor is able to discern the real story of the market in a particular security so that he or she can make an educated decision as to what position to take in a security.

In this specification, quote requests and orders are generally referred to as instructions whereas the quotes and executions are generally referred to as responses to the instructions, but are transmitted as instructions.

The floor broker executes orders and obtains quotes according to instructions from the booth clerk. The floor broker is typically stationed at one of several trading panels. It is not uncommon for a floor broker to specialize in a few select securities. The specialized floor broker can therefore generally be located on the crowded trading floor in the vicinity of a certain trading panel; however, the floor broker is only effective in his or her function if he or she is free to move from panel to panel, and to different posts.

Traditionally, the booth clerk transcribes the instructions onto either an order slip or a quote request form, depending on the nature of the instruction. The booth clerk decides whether to send the instruction to the trading post electronically, or to use a floor broker. In the event that the booth clerk decides to use a floor broker, he or she enlists the aid of pages or runners to carry the instructions to the floor broker because the booth clerk is situated around the perimeter of the trading floor. Likewise, the floor broker provides the page with transcribed quotes and executions in response to all of the instructions that the floor broke has handled since the last time a page found that broker in the trading crowd. In this manner, the floor broker can remain in the crowd, doing his or her job. Further, the floor broker may provide the page with an "unsolicited quote," that is, insight on the market that may be important to investors being represented by the floor broker, but who have yet to specify such a request. Hence, the astute floor broker, recognizing activity at the trading panel that may be of interest to the investors he or she represents, transmits unsolicited quotes back to the booth clerk so that the clerk can disseminate the information as appropriate. The page runs the quotes, executions, and unsolicited quotes to the booth clerk for reconciliation and reporting.

By law, orders must be handled in a timely manner. The transcribed instructions must be delivered to the floor brokers and the transcribed executions and quotes must be retrieved from the floor brokers and returned to the booth clerk promptly. However, the slips of paper on which orders and quotes are recorded can be easily misplaced, and if dropped, can be lost among a plethora of discarded slips that were scribbled in a trading frenzy. Any attempt to locate a slip dropped onto the crowded trading floor will be frustrated by the constant movement of floor brokers, pages, and the like. See, for example, Smith, "Tossing Out Tickets," Wall Street & Technology, V. 11, No. 13, pp. 52–88 (1994).

Until an order or quote is returned to the booth clerk, the booth clerk cannot apprise the investor of progress on the instruction. For example, in an upwardly mobile market, a booth clerk cannot report the partial execution of a buy order, or the average price for that portion of the filled order, until the executions are retrieved from the floor brokers and reconciled with the order. The floor broker on either side of a transaction transcribes the time of the transaction, the side of the transaction (buy or sell), and the time, so that the trades can later be reconciled. A unique badge number is usually reprinted on each floor broker's "deck" of execution slips to facilitate reconciliation.

While there has been automation of virtually every aspect of the marketplace, the actual auction, and the participation of the floor brokers, has been safeguarded against obsolescence in view of the fairness and efficiency of the pricing mechanism that results from the auction process. The automation process has been driven, in part, by the desire to make the auction market more efficient and effective. First, it is desired to decrease the time between the decision to buy a stock and the actual execution and report. By eliminating paper, the market is more efficient. This is desirable to enable the auction market to effectively compete with emerging third markets, and to handle the ever growing volume of daily trading. See Schmerken, "Off-Exchange Trading Chips Away At NYSE Volume," Wall Street & Technology, V. 10, No. 4, pp. 4248 (1992).

A concern to investors and commission houses is that the instruction be accurately transcribed. If either the original instruction or the handled response is illegible, processing of the instruction will be delayed. For example, one side of an execution may not be reconcilable with the other because either the price or quantity is misconstrued. Alternatively, the instruction may not be handled at all until clarified. The potential for error increases with each transcription of the instruction. Further, these transcriptions delay processing of instructions which can jeopardize the utility of each instruction. For example, a one day limit buy order might be unexecutable if the market advances beyond the highest acceptable purchase price in the time since the investor placed his or her order and the floor broker received the order slip.

With the advent of "beeper" technology, the physical markets have modified the traditional system of transferring instructions and responses thereto between booth clerks and floor brokers. Using this technology, in lieu of handing the instruction slip over to a squad member or page, the booth clerk uses a beeper—usually equipped with a vibrator because of the noise on the trading floor—to alert the floor broker that an order has been received. Once alerted, the floor broker leaves the trading crowd to locate a "yellow phone" with which he or she contacts the booth and receives instructions (and possibly reports executions and quotes). The floor broker transcribes the instruction relayed by the clerk and returns to the trading panel. Because numerous instructions are typically received at the booth while the floor broker is in the trading crowd, the floor broker is constantly "beeped" in an attempt to forward more instructions in the midst of trading sessions. Further, inquiries from investors as to the status of an order or quote can only be satisfied by again beeping the floor broker and pulling him or her from the crowd. Accordingly, this advance in technology has not provided assurances that instructions are being faithfully followed and timely processed, and has required the broker to continuously leave the trading crowd and locate an available yellow phone to communicate with the booth clerk.

In June, 1994, cellular phone headsets were introduced onto the floor of the New York Stock Exchange ("NYSE"). However, this arrival has its own limitations. Because the booth clerk communicates with several brokers, perhaps ten or more, the brokers may not be able to reach the booth clerk if he or she is already talking to another broker. Further, communications with the clerk from the midst of the trading crowd can confuse other members of the crowd insofar as it may not be readily apparent that the floor broker is talking to his clerk and not another person in the trading crowd, especially if the floor broker communicating with the clerk is facing another floor broker or a specialist. When a floor broker is reporting an execution of a sale of 5,000 shares of GM, for example, another person in the crowd may mistakenly counter with an offer to buy. Thus, while cellular phone headsets have permitted the floor broker to communicate with booth clerks while retaining their mobility, the possibility of mistranscription and delays in reporting still abound.

Compounding these problems, a clear audit trail of the orders and executions is not created at the time of the trade, but rather only at some time thereafter, and in some cases only after the close of the trading day. As a result, the traditional procedure has subjected investors to undesirable risk. One solution was proposed in U.S. Pat. No. 5,297,031 to Gutterman et al. That system provides brokers on a commodities exchange with a computer terminal that matches buy and sell orders in accordance with the investors's instructions, such as limit orders, etc., and further provides an electronic audit trail of executed orders. However, the disclosed workstation is not portable, and therefore is not usable within the trading crowd. Further, while this system provides an acknowledgement that a message was received at the broker's workstation, it does not inform the sender that the recipient has seen the received order. As a result, users of this system are left in a quandary as to whether the transmitted instruction was noticed until an execution is received. Because the workstation remains unattended while the broker is in the trading crowd, in the bathroom, etc., orders or quote requests could remain unnoticed for unacceptable periods of time.

Efforts are underway to phase-out the job of the runner or page by introducing hand-held computers to the exchanges. See, e.g., Pettit, "Technology Outruns Even the Runners On Wall Street," The Wall Street Journal, p. B6D, Aug. 19, 1994. For example, handheld instant trade matching terminal known as "AUDIT" (Automated Data Input Terminal) is presently being tested on the floor of the Chicago Board of Trade, with some difficulty. See "Bug Fixes Will Push AUDIT Test Into April—At Least," The Wall Street Letter, p. 7, Mar. 1, 1993. This device uses limited handwriting recognition to allow brokers to enter trade information into a handheld terminal. The AUDIT system broadcasts data on each trade from the trading pits to the exchange computers. See, Burns, "A Handheld Computer That's Combat Hardened," Business Week, pp. 94–96, Apr. 18, 1994. Also, at the Coffee, Sugar & Cocoa Exchange, a handheld terminal which resembles a calculator with dedicated alphanumeric and function keys is being tested for reporting the price and month of each futures and options contract. See, Wall Street & Technology, V. 10, No. 4, p. 14 (1992).

What is needed in the art and has heretofore not been satisfied is a reliable system that provides assurances that instructions are noticed, timely processed, and faithfully followed regardless of the location of the floor broker on the trading floor. Also needed is a system that provides the foregoing assurances and that further provides an audit trail for assisting in reconciling any unreconciled trades. Of further benefit to the art, would be such a system that further allows monitoring of the activities of one or more floor brokers so that investors and commission houses can be apprised of the progress on any particular instruction, throughout the trading day and without difficulty. The present invention satisfies these and other needs in a two-way communications system between the booth clerk and floor broker.

SUMMARY OF THE INVENTION

Figure 1:
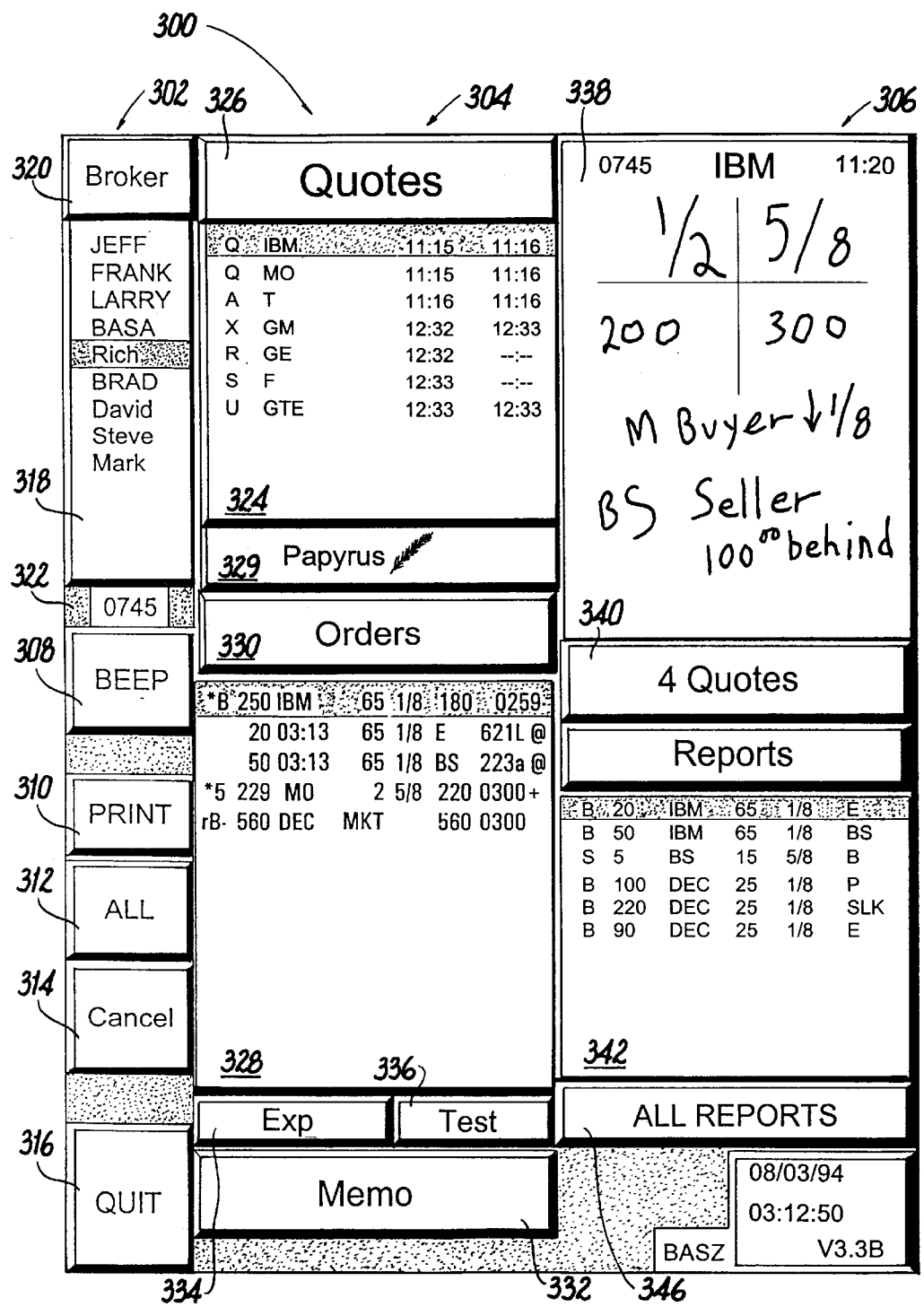
FIG. 1 shows a display screen in accordance with a preferred embodiment of the invention for managing the activities of one or more floor brokers.

The wireless system of the present invention handles the three basic instructions handled by floor brokers to supplant conventional paper-based systems. These instructions are: (1) quotation requests and quotations, (2) orders and executions, including a series of partial executions against a common, larger order, and (3) memos between the floor broker and a booth clerk or another floor broker.

In accordance with one aspect of the invention, there is provided a method of providing assured communications in a two-way wireless communications system adapted for use on the floor of an exchange. The method includes the steps of transmitting an instruction as a signal from a first device to a second device, altering the signal at the second device to provide an indication that the instruction has been received by the second device, echoing the altered signal from the second device to the first device, acknowledging receipt of the instruction by providing an indication that the received instruction has been seen by an operator of the second device, the step of acknowledging including further altering the previously altered signal at the second device, and transmitting the further altered signal from the second device to the first device. Hence, the method provides at least notification to the sender that an instruction has been successfully transmitted to the other's device, and that the recipient has physically acknowledged receipt the transmitted instruction. Further, the invention provides continuous information as to the handling of the transmitted instruction, that is, partial executions against orders, cancellations, and the like. In this manner, an assured communication system is established, with the result that the clerk, manager, or investor has complete knowledge of the status of an order or quote request throughout the trading day.

According to a further aspect of the present invention, a method is provided for managing the activities of one or more floor brokers situated on the floor of an exchange. The method includes the steps of reviewing any delegated instructions that have a pending status so as to monitor the progress of any one of the one or more floor brokers, determining the one of the one or more floor brokers who is best able to handle a further instruction by comparing the relative number of reviewed delegated instructions having a pending status, finding the floor broker with a comparatively few number of pending instructions, and delegating the further instruction to the one of the one or more floor brokers who is determined to be best able to handle the further instruction. As an optional step, the manager may simultaneously monitor the progress of more than one floor broker. Further, by managing the activities of the floor brokers in real-time, the manager can be responsive to customer or investor requests for status reports on executions against order, quotations, and to requests to cancel orders, etc. Also, the customer or investor may obtain a status report directly from the floor brokers, when authorized to do so, by monitoring the progress of the pending and completed instructions.

The invention also pertains to a method of entering a limit order price above which an investor is willing to sell a security or below which the investor is willing to purchase the security. This method includes the steps of entering into a computer a whole dollar portion of the limit price, selecting a denominator which establishes a grating of fractional dollar amounts, and entering the fractional dollar portion of the limit price by one of incrementing and decrementing a numerator in accordance with the grating until the fractional dollar portion of the limit price has been obtained.

Also, the invention pertains to a method of reporting an execution. This method includes the steps of entering into a handheld device a whole dollar portion of a price at which a security has been traded, selecting a denominator which establishes a grating of fractional dollar amounts, entering the fractional dollar portion of the price at which the security has been traded by one of incrementing and decrementing a numerator in accordance with the grating until the fractional dollar portion of the price at which the security has been traded has been obtained, and reporting the price at which the security has been traded.

In accordance with another aspect of the present invention, all data that is entered by either the booth clerk or the floor broker may be entered using an electronic pen either in the user's own handwriting, or by activating buttons or selecting data from a list of entries.

According to a further aspect of the invention, a system for processing one or more executions against an order is described in which a data structure is stored in a local computer-readable memory. The data structure includes information resident in a database used by an application program and includes a plurality of data packets stored in the local computer-readable memory, each of the data packets containing information from the database and further containing a sequence code and a volley code, the sequence code associating a subset of the plurality of data packets together and the volley code defining a hierarchical relationship among the subset of data packets. The data structure also includes an order data packet that is one of the subset of data packets and has one hierarchical level, and at least one execution-type data packet that is a different one of the subset of data packets and has another hierarchical level. The data structure defines the execution-type data packet as having a many-to-one relationship with the order data packet, and each of the execution-type data packets is defined by a uniquely assigned execution sequence number which is assigned by the application program.

ORDER OF THE DETAILED DESCRIPTION

A. The Clerk Station Management Screen
   1. Administrative Control
   2. Broker Status
   3. Incoming Messages
B. The Clerk Station Data Entry Screens
   1. Quote Entry Form
   2. Order Entry Form
   3. Memo Entry Form
C. The Handheld Device Display Screen
D. The Handheld Device Data Entry Screens
   1. The Handheld Device Quote Entry Screen
   2. The Handheld Device Report Entry Screen
   3. Transmission of Unsolicited Quotes
E. The Volley Codes
   1. Connectionless Service
   2. The Data Structure
      a. Data Packet: For Requests For A Quotation
      b. Data Packet: For Quotation Responses And Memos
      c. Data Packet: For Orders And Executions
   3. The Volley Code Progression
   4. Retransmission of Unanswered Signals
   5. Cancellation of Orders
   6. Secondary Transmissions
F. Example
   1 Creation Of Outbound Instructions
   2 The Send Routine
   3 The Receive Routine
   4. Operation Of Handheld Device
   5. Operation Of Base Station
G. Modifications And Embellishments

DETAILED DESCRIPTION OF A PREFERRED EMBODIMENT

The system of the present invention comprises at least one base station ("BS") and one handheld device ("HHD"). The base station may comprise a personal computer, for example, a 386 or 486 based machine (or faster). In a presently preferred embodiment, the GRiD Systems Convertible 486 Pen computer is used as the base or clerk station. This computer accepts data input from pen-type input devices. Such input devices may include those having a plastic stylus for applying pressure at individual or groups of screen picture elements, or may be designed to effect a local change of electric or magnetic field, for example, by providing a resistor at the tip of the input device to drain charge, when the device is positioned or lightly applied in the vicinity of a screen picture element. One machine that is suitable for the handheld device is the Fujitsu PocketPad™ RF Handheld Computer. Each of these computers is capable of recording and storing the transmissions therebetween during the course of a trading day.

Also in a preferred embodiment, Proxim RangeLan 1 and 2 Spread Spectrum radios are connected to these machines and to Proxim Access Point Wireless Ethernet Bridges to provide the wireless communication link. Cisco Routers are used to tie the inventive system into the network of the stock market exchange. The software may be written and developed using the Microsoft C++ Language.

Exemplary display and data entry screens are described first, followed by the operation of a system constructed in accordance with the exemplary screens.

A. The Clerk Station Management Screen

FIG. 1 shows an exemplary display screen 300 of the BS that may constitute a management screen for monitoring the activities of one or more floor brokers. The management screen 300 contains three principal sections: one for administrative control 302, another for the broker status 304, and a third for incoming messages 306. This and other screens are readily developed using commercial packages such as PenRight! Pro, a pen software development tool for screen design, layout, and handwriting recognition. While certain information has been shown displayed on management screen 300, other information can also be displayed, for example the date and the time, and further sections can be provided, such as additional sections 304, as understood by those skilled in the art.

1. Administrative Control

The administrative control section 302 allows the clerk to select a floor broker to send a message to, page or beep (using a button 308), or monitor his or her status. The clerk prints the orders, execution reports, quote images, or any combination thereof, sent by the floor brokers by pressing a print button 310. All buttons on the screen are actuated by pressing a pen-type input device against the portion of the screen occupied by the button. The administrative control section 302 further allows the booth clerk to review all of the orders—regardless of whether they have been filled—using an all button 312, cancel an order using a cancel button 314, and exit the program using a quit button 316. A broker-list box 318 having a broker button 320 at the top enables the booth clerk to select among several listed brokers. Brokers are selected by touching the screen 300 within the broker-list box 318 at the line of a particular broker's name. In FIG. 1, broker "Rich" has been selected, as indicated by inverse text. Other brokers may be added to the list, and listed brokers may be deleted therefrom, using the broker button 320. The unique badge number of the selected broker is indicated at 322.

2. Broker Status

The broker status section 304 of screen 300 displays those quotes and orders that have been delegated to a selected floor broker for handling, but which have not yet been handled, and are therefore "pending." As shown in FIG. 1, the status of the instructions delegated to broker "Rich" is presently being displayed at the clerk's station. This display substantially mirrors the display screen of the handheld device that the floor broker "Rich" is using on the floor of the exchange to receive orders and quotation requests and report executions and quotes. The clerk can review the status of any of the various brokers listed in the broker box 318 by touching the screen with the pen-type input device at the location on the screen where a particular broker's name appears. By reviewing the status of the various broker's available to the clerk, he or she can serially monitor the progress of each of the brokers, and can distribute new orders and quote requests to the floor broker that is presently best able to handle additional requests, in the judgment and discretion of the booth clerk. As used herein, "status" refers to the stage of the transaction, that is, whether a quotation has been received in response to a quotation request and whether an order has been completely filled. If the quotation has yet to be received, or an order remains unfilled, or only partially filled, the status is "pending."

Consider, for example, a request to buy shares of a stock that has been conveyed to the booth clerk from the trading desk. If the floor broker that normally would handle that stock, or work the section of the exchange floor where that stock is traded, has what the clerk deems to be too many unfilled orders or quote requests in his or her deck, the clerk may review the decks of other brokers in broker list 318 to find one who has fewer pending instructions. The clerk then forwards the instruction to that broker, or to the specialist directly for execution. The broker list 318 may include house brokers that work for the clerk's commission house and independent brokers (also known as "two-dollar" brokers because they perform their services for a fee). This affords the clerk management discretion in delegating instructions from the trading desk, which maximizes efficiency and cost concerns.

The determination of who among several floor brokers is best able to handle a further instruction may be made, for example, by comparing the relative number of instructions having a pending status that have been delegated to the floor brokers, and finding the floor broker with a comparatively few number of such instructions. This may be done by a programmed computer with regard to the information in the header of the data structures stored in the memory of the computer that comprises the BS. Further, when the floor brokers are assigned to zones on the floor of the exchange in which certain trading posts are located, this determination may be made by a programmed computer with regard to (1) the zone in which the particular security for which the further instruction relates is traded, and (2) the floor brokers that have been assigned to that zone. By providing the broker status 304 on the display of a computer screen, the booth clerk (or other person) can monitor the progress of one more of the floor brokers.

The broker status section 304 has three main portions: a quotes box 324 with a button 326 therein, an orders box 328 with a button 330 therein, and a memo button 332. Touching any one of these buttons 326, 330, and 332 with a pen-type input device calls up a data entry form for sending instructions to the floor broker who has been selected from the broker list 318. On the other hand, touching the line entries in the orders box 328 provides information on the executions against the order, if any. In particular, along the right margin of the orders box 328, there is seen a "+" symbol adjacent the line entry for the order concerning the stock symbol "MO." With further reference to this line entry, it is seen that the order was to sell 22,900 shares of MO for a price no less than 2 and $5/8$ dollars per share, and that there are 22,000 shares remaining to be sold (quantity is in 100's or "round lots"). The "+" plus symbol readily informs the clerk that if the clerk were to touch that line entry with the pen-type input device, a listing of the executions that account for those 900 sold shares, and the price at which those shares were traded, can be displayed (and reported to the investor). In the case of the line entry for the stock symbol "IBM," the right margin notation "–" indicates that the listing of executions against the order to buy 25,000 shares is being displayed, and that two partial fills were executed against that order, one for 2,000 shares and another for 5,000 shares, both at the highest price that the buyer was willing to pay, namely 65 and ⅛ dollars per share.

An exp button 334 is provided for development purposes and is normally inoperative unless, for example, the user signs on to the system with a special password. Activation of this "experimental" button causes certain subroutines to be executed for testing purposes. Also, a test button 336 is provided for checking the hardware of a remote device such as a particular floor broker's handheld device. Pressing the test button 336 causes a signal to be transmitted to a particular handheld device which responds in turn with a signal. The test routine calculates how much time elapsed between sending the message and receiving a response. This test may be performed, for example, when a signal is sent to a hardware device but receipt has not been acknowledged. As an illustration, a request for a quotation on the stock Ford whose symbol is "F," as shown in quote box 324, has been sent to floor broker "Rich," however, Rich's system has at this time not yet responded that it received the request (compare to the GE quote above in which the R volley code, as described below, indicates that the floor broker's hardware received the quote request).

Figure 4:
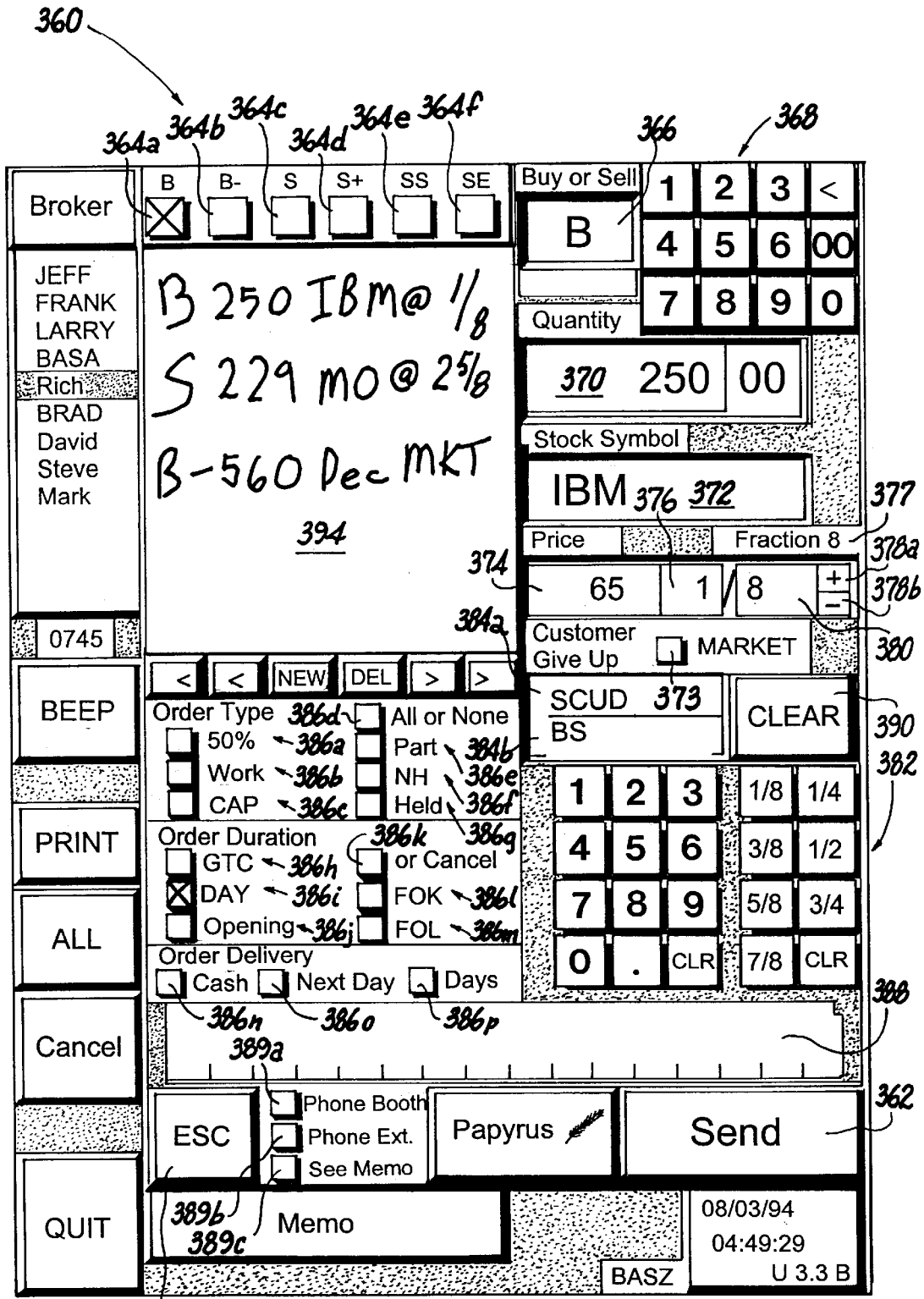
FIG. 4 shows an order entry screen of the preferred embodiment for entering orders to be transmitted to a selected floor broker for handling.

A scratch pad button 329 is also provided to allow the clerk to call-up a blank scratch pad for entering in notes. The pad may be as scratch pad 394 (FIG. 4). The pad may be positioned on the screen so as to not interfere with the monitoring of the broker status, that is, so as to not overlap the broker status section 304, or may be positioned otherwise.

While the broker status section 304 has been described as a single section of the display screen 300, so that brokers may be serially monitored, the invention is not so limited. More than one broker status screens may be monitored at any one time, as understood by those skilled in the art.

3. Incoming Messages

The incoming messages section 306 of the display screen 300 apprises the clerk of the most recently received messages from any of the brokers, and not necessarily only the presently selected broker. An image box 338 on top displays the image of a quote or message that has been sent to the clerk. Additional images may be shown—up to four at a time—by pressing a "four-quotes" button 340 located just below the image box 338 (see FIG. 2). A report box 342 is located in the lower half of the incoming messages section 306. The report box 342 displays the executions generated by all of the floor brokers that are being monitored (that is, listed in broker list 318) against the various orders sent by the clerk. Receipt of each incoming report may be individually acknowledged by touching the screen in the space occupied by the report listing. Alternatively, an all reports button 346 can be pressed to acknowledge receipt of all of the reports in the report box 342.

In FIG. 1, the image box 338 displays the handled results of a quote request made by the clerk as responded to by "Rich." With further reference to image box 338, the upper left hand corner of that box shows the badge number of the broker that sent the message. This badge number, 0745, is the badge number shown at 322 in the administrative control section 302 of the management screen 300. This badge number corresponds to the selected broker, namely, "Rich." The image in box 338 is a quote for the stock whose symbol is IBM. The clerk initially requested the floor broker to get a quote on the stock IBM at 11:15 a.m., as indicated on the first line of the quote box 324. "Rich," the floor broker, acknowledged receipt of that quote request one minute later, at 11:16 a.m. At 11:20 a.m., Rich transmitted the requested quotation back to the clerk, as indicated by the time stamp in the upper right corner. The quote shows that there 20,000 shares to buy and 30,000 shares to sell (again, share volume is typically represented in 100's) at the quoted bid and ask prices, as could be obtained by conventional quote. However, in accordance with the present invention the floor broker is able to transmit further insight as to the state of the market, namely that Merrill Lynch has a buying interest at ⅛ a point below the spread, namely, at ⅜ and that Bear Stearns is the seller of 30,000 shares and has 100,000 more shares behind the 30,000 presently being quoted.

Figure 2:
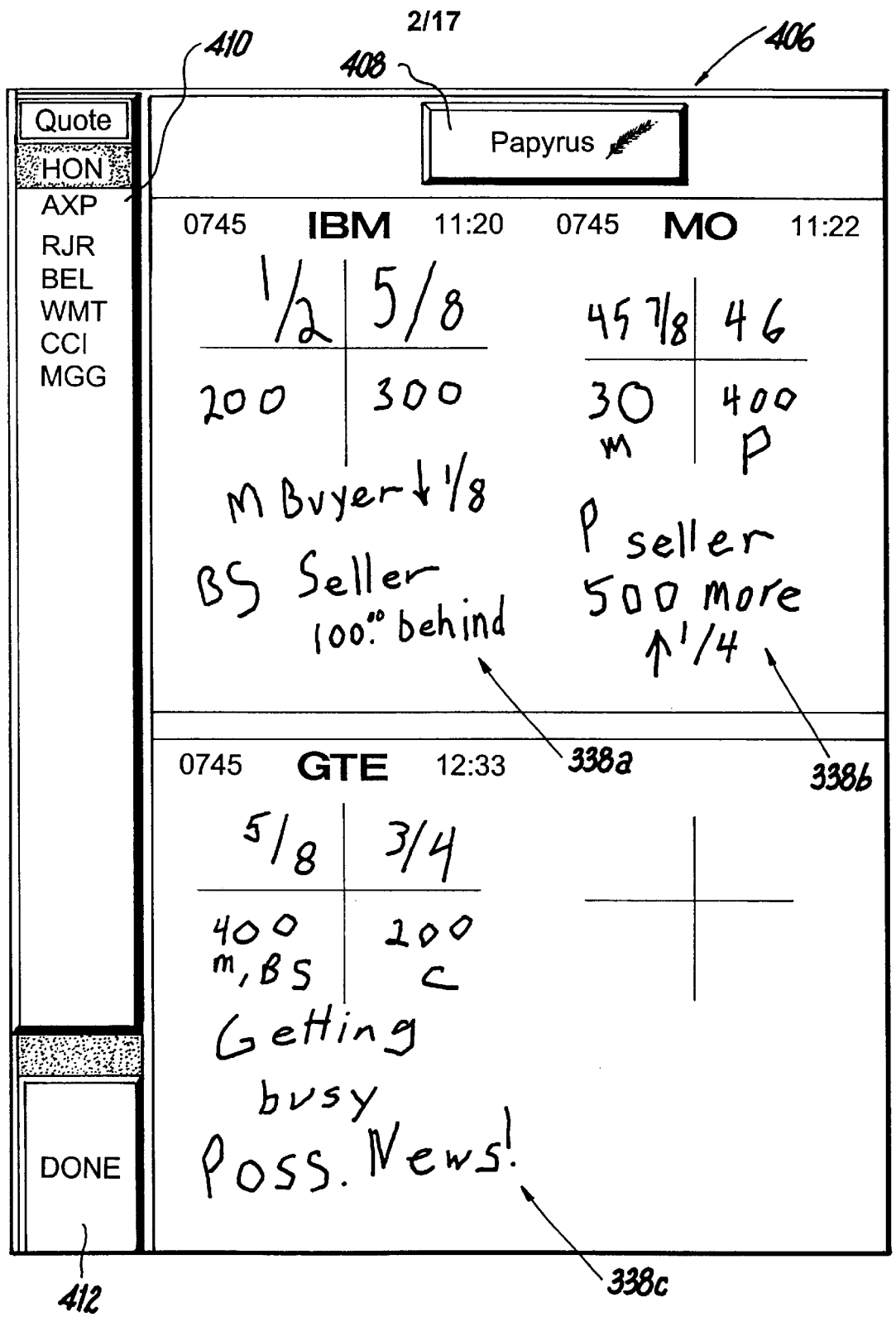
FIG. 2 shows a second display screen of the preferred embodiment, the second display screen adapted to display a plurality of quotations received from one or more floor brokers.

While the management screen 300 can readily display one of such image boxes 338, the clerk can display additional image boxes 338 by pressing the four-quotes button 340. When the four-quotes button is pressed, the management display screen 300 disappears in favor of the four-quote screen 406, as shown in FIG. 2. The four-quote screen displays image boxes 338*a,b,c,* etc. A blinking or darkened button 408 at the top of the screen indicates that there are more images than those being presently displayed. Preferably, the four-quote screen 406 only displays quotes from the floor brokers, and not memos from the floor brokers. Along the left margin of the four-quote screen 406 is an archive quote box 410 which stores quotes that have been archived. The quote or memo is archived when the clerk acknowledges that he has viewed the quote. The clerk acknowledges his having viewed the quote by touching the quote on the screen with a pen-type input device. At that time, the quote is moved to archive and is cleared from the screen. Any remaining quotes cycle such that the quote which had previously been displayed on the screen longest will be in the upper left hand corner, the second oldest quote will be in the upper right corner, the third oldest quote in the lower left corner and the most recently received quote that can be displayed on the screen will be displayed in the lower right corner.

By not displaying memos on this screen, the memos are not ported to the archive along with quotes. In recognition of the potential abuse of the transmission of personal messages under the auspices of an unsolicited quote image, a separate memo feature has been provided. As described more fully below, the memoranda are transmitted in a manner that minimizes the encumbrance on the allocated bandwidth for transmission. When the clerk is done viewing the quotes, or needs to fill out an order, the done key 412 is pressed, which causes the base station to return to the management display screen 300.

B. The Clerk Station Data Entry Screens

As noted above, buttons 326, 330, and 332 in the broker status section 304 call-up data entry forms for sending information to a particular floor broker who has been selected from the broker list 318. These forms provide convenient templates for allowing the clerk to relate pertinent information to the selected floor broker. The forms have been designed so that the clerk can enter the information into the form while initially receiving an instruction from the investor, as shown at step 710 of FIG. 14. The forms need not be completed by the clerk; they can be filled-in off the exchange floor and forwarded directly into the handheld device of a selected floor broker by constructing or formulating an appropriate data packet, as at step 720. For example, the forms may be filled out by a person at a commission house's trading desk, or by a broker on the floor of another exchange, for example, an equity options exchange. The three principal data entry forms are described below.

1. Quote Entry Form

Figure 3:
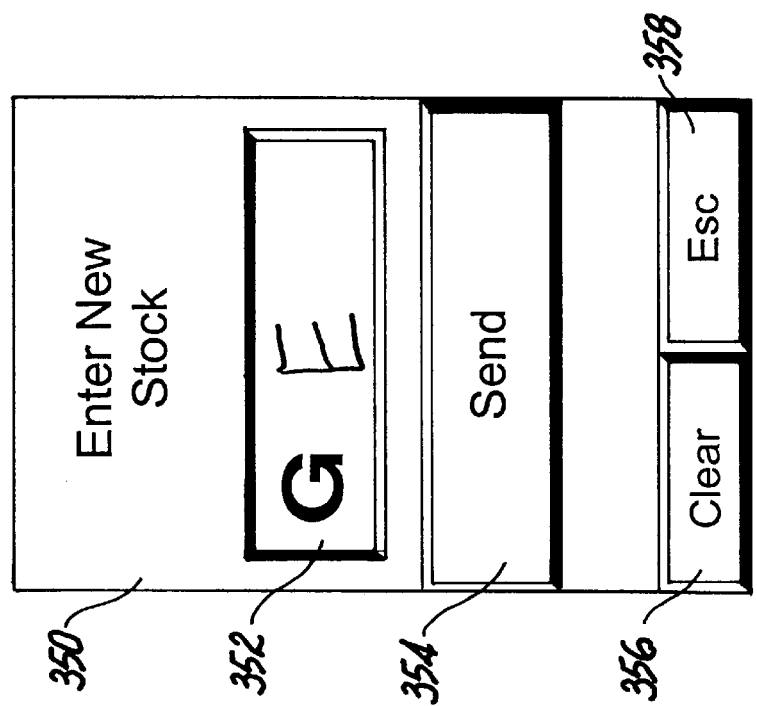
FIG. 3 shows a quote entry screen of the preferred embodiment for formulating a quote instruction to be transmitted to a selected floor broker for handling.

A quote entry form 350 is illustrated in FIG. 3. The quote entry form 350 has a region 352 for entering the symbol of a stock by using a pen-type input device. As seen in FIG. 3, the symbol for the stock GE has been entered into the region 352. The first character "G" has been recognized by the system software and converted into computer readable text. The second character illustrated, the letter "E," has not yet been converted. It will be converted by the system just after it has been entered into the region 352, and after the pen has been lifted from the screen. Advantageously, each of the BS and HHD are provided with a list of recognized stock symbols to which the symbol entered into the region 352 may be compared. If the symbol entered into the region 352 does not compare favorably with known symbols traded on that exchange, a warning screen or other alert mechanism may be presented to the user.

Because handwriting recognition can be difficult, the system uses handwriting recognition sparingly, and generally provides alternative methods of entering information by means of buttons, lists, and the like whenever practicable. While handwriting recognition has been used in entering the stock symbol in the region 352, buttons or look up lists could be used with equal advantage to select the characters or the symbol of the stock for which a quote or order is desired.

The quote entry form 350 further includes a send button 354 which when touched causes the BS to transmit a quote request to the broker who had been selected at the time that the quotes button 326 was depressed. Hence, a clerk selects a broker from the broker list 318, presses the quotes button 326 to pop open the quote entry form 350, enters the symbol of the stock for which a quote is desired by scribbling the symbol into the region 352, and then touches the send button 354 to transmit the quote to the selected broker. A clear button 356 clears an entry in the region 352 and an escape button 358 returns the operator to the management display screen 300.

2. Order Entry Form

An order entry form is illustrated in FIG. 4. The order entry form is called-up by pressing the orders button 330. The order entry form 360 allows the clerk to enter in the type of transaction (buy minus, sell plus, sell short, and short exempt) the quantity, the symbol of the stock, the price, the give-up, customer, any instructions that accompany the order including the type (all or none, etc.), duration (good till cancel, good for the day, etc.), and delivery (cash, next day, etc.), and to select which broker should handle this order from the broker list 318. Once the clerk has completed the order entry screen, he presses a send button 362 to transmit the order to the selected broker.

To facilitate data entry, the foregoing elements of the order are entered into the order entry form 360 primarily by way of buttons and look-up lists. For example, the order side may be entered by use of buttons 364*a* through *f*. Alternatively, the order side could be entered in handwriting in a region 366. The quantity of the order is entered either using a key pad 368 or by handwriting recognition in a region 370. The stock symbol is entered into a region 372 by handwriting recognition. If the investor has instructed to buy or sell at market price, then the market button 373 is pressed. On the other hand, for limit orders, the whole dollar price that the customer will accept in the trade is entered into region 374, and the price fraction is entered in a region 376. This may be accomplished by handwriting recognition, or by a keypad 382.

In accordance with an aspect of the present invention, the price fraction is adjusted in a manner to facilitate data entry by minimizing the number of strokes required to enter in the data. The price fraction consists of a fraction setting 377 which fixes the denominator reference value. The present fraction setting is changed by touching a region 380, graphically displayed in FIG. 4 in the denominator position for clarity. Each time the region 380 is touched, the fraction setting 377 cycles to its next preset value. Preferably, the fraction setting 377 cycles the denominator in the following order: 8, 16, 32, 64, 8, etc. However, other denominator settings, for example, 2, 4, 128, and 256, and odd value settings, may be preset if deemed useful for a particular application. A pair of buttons 378*a,b* respectively labeled "+" and "−" cause the fraction itself to be incremented or decremented according to the interval established by the present fraction setting 377. As an illustration, if the fraction setting 377 is preset to the value 8, and the fraction displayed in boxes 376 and 380 corresponds to ⅛, the price fraction 3/16 may be entered by touching the region 380 to cycle the fraction setting 377 to the value 16 (at which time the value stored for the numerator in the region 376 is incremented to two so that the numerator/denominator relationship remains ⅛) and (1) pressing button 378*a* to increment the numerator so that the fraction displays 3/16, or (2) writing a three into the region 376. With the fraction setting 377 now at the value 16, subsequent presses of the button 378*a* cause the fraction to increment from the value 3/16 to ¼, 5/16, ⅜, 7/16, ½, etc. On the other hand, if the fraction setting 377 is cycled back to the value 8, the 3/16 value is rounded down to ⅛ because that is the greatest fraction that can be represented by the new fraction grating. If fraction is then incremented by pressing button 378*a*, the increment is less fine: ⅛, ¼, ⅜, ½, etc.

The price fraction may be adjusted up or down with buttons 378*a,b*, respectively, to effect a change in the whole dollar portion of the price in the region 374 by attempting to reduce the fraction to a negative value, or by attempting to augment the fraction to unity or greater. Alternatively, the whole dollar portion may be unaffected by such fraction changes, and the fractional portion of the price may instead cycle from, for example ⅛ to ⅝, ⅞, ⅝, when button 378*b* is pressed, and vice versa when button 378*a* is pressed.

Also provided is a customer/give-up box 384 that allows each of the customer and give-up entity to be entered. The "customer" as used in this specification includes the actual person requesting the trade, each of the trading desks (institutional, retail, arbitrage, etc.), direct access entities (those brokerage firms on the floor that do not have trading desks), and the like. The give-up entity is the exchange member that the transaction is given to for processing and settlement purposes. The customer and give-up entity information forms a part of the order. As a result, the floor broker is alerted to which customer has requested the trade, which in turn may connote certain handling procedures are called for. For example, the arbitrage trading desk may require faster execution than the institutional trading desk, as a general rule. Further, the identification of the customer aids in the subsequent clearing process.

Figure 5:
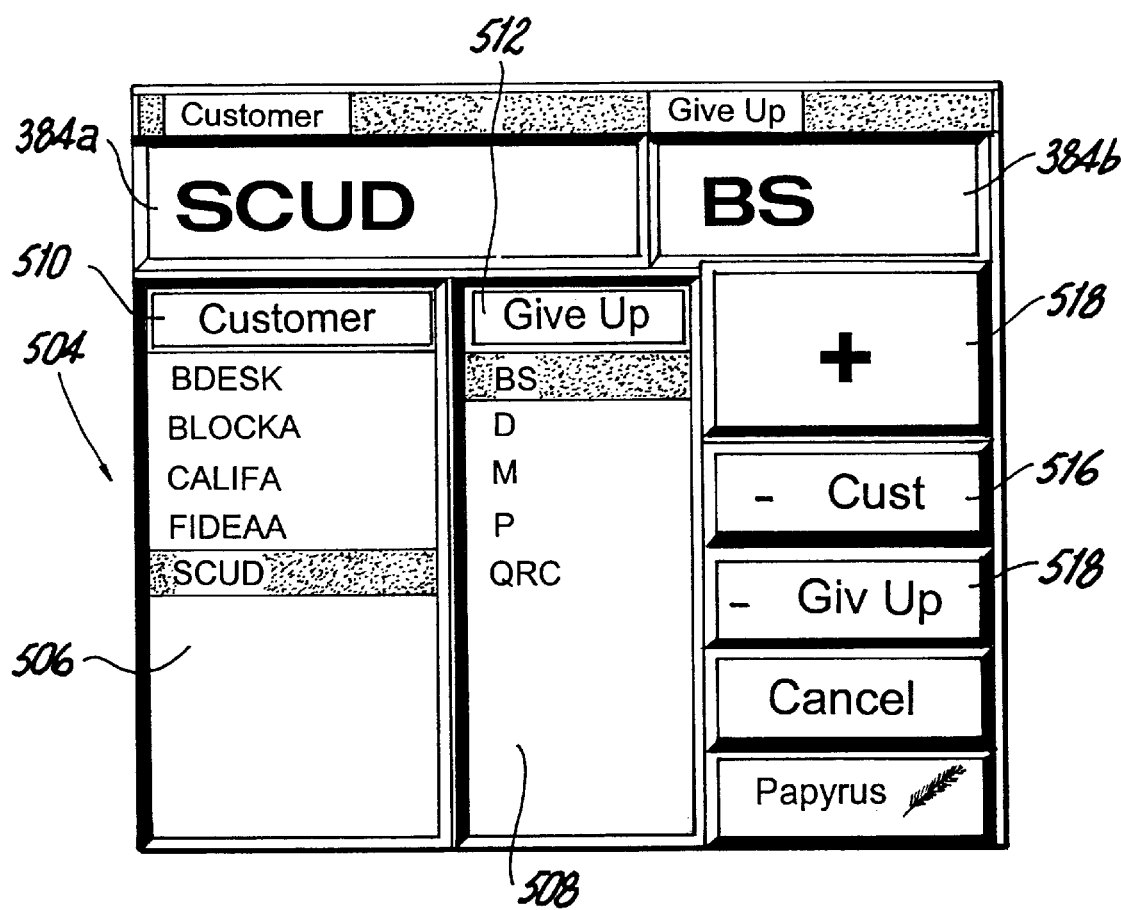
FIG. 5 shows an entry screen of the preferred embodiment for entering customer and give-up information.

The data in the customer/give-up box 384*a,b* may be entered by handwriting recognition or by selecting from a list of known customers and give-up entities. In FIG. 5, customer/give-up box 384 has been touched to cause pop-up lists 504 to appear on the screen. A list of customers 506 and a list of give-up entities 508 appears in this box, along with buttons 510, 512 which respectively permit the list to be reconfigured to include additional or fewer customers and give-up entities. For example, an additional customer is added to the list by writing the acronym for that customer in the box 384a, pressing the customer button 510, and then pressing an add button 514. After pressing the add button, the customer just entered into the box 384 can be selected at a later time by touching that customer in the list. As a result, the need to use handwriting recognition—which is slower than selecting from a list—is minimized. Customers are removed from the list in a similar manner, except a respective minus button 516, 518 is pressed. Hence, the customer and give-up entity lists are dynamically changeable to add new customers and give-up entities or delete same.

Because the customer or give-up entity list may exceed the screen space allocated for the pop-up lists 504, these lists preferably automatically scroll to the portion of the list that corresponds to each character written into the boxes 384a,b. Hence, if the letter "C" is written into the box 384a, then the list will scroll to the entries in list 506 that start with that character. If the present customer is then shown in the list 506, that customer can be selected by touching that entry, without having to enter the full customer acronym in the box 384a. As a further preferable feature, the last give-up entity that was associated with the chosen customer is automatically selected as the present give-up entity.

Any terms on the order can be checked off in the check boxes 386a though p, as shown in FIG. 4. The broker selected from the broker list 318 may require further information depending on the particular terms checked off. For example, if 386p were checked, the clerk would enter the number of days in a memo box 388 in which the order delivery must be completed. The memo box 388 allows a brief memo (up to 16 characters long) to be attached to the order. As a further convenience, canned messages may be filled into the memo box 388 by pressing one of buttons 389a–c. These messages may request the broker to phone the booth, or a particular extension that the clerk enters into the memo box 388. These canned messages further reduce the need to rely on handwriting recognition and thereby expedite the electronic transaction of the trades. If there have been any mistakes in the order, the clerk presses a clear button 390; however, if the order is ready to send, the clerk need only press the send button 362. The clerk may at this time return to the management menu by pressing the escape button 392, or may send further orders by clearing the order entry form 360 (with the clear button 390) after the send button 362 has been pressed.

The order entry form 360 further has a scratch pad 394 in which the broker can jot down other orders or quote requests that arrive while he or she is in the process of entering an order. Hence, if the clerk is in the middle of entering in an order to buy 25,000 shares of IBM at 65 and ⅛, as shown in FIG. 4, the clerk can make note of these other orders, such as sell 22,900 shares of MO at 2 and ⅝ and buy minus 56,000 shares of DEC at the market price, as illustrated in scratch box 394. These other orders may be relayed to the clerk for entry (or other person entering in such data) at steps 702, 708, and 710 of FIG. 14.

3. Memo Entry Form

Figure 6:
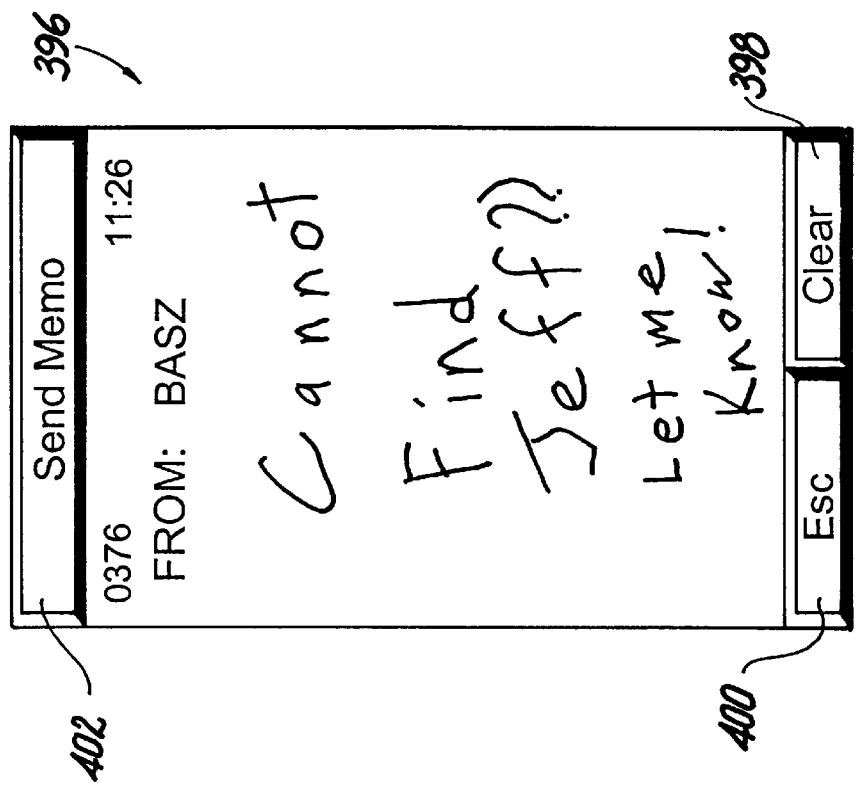
FIG. 6 shows a memo entry screen of the preferred embodiment for entering memos to be transmitted to a selected floor broker.

By pressing the memo button 332 in the broker status section 304, the clerk can call-up a memo entry form 396 for sending a memo to any one of the brokers listed in the broker list 318 of FIG. 1, as shown in FIG. 6. The memo entry form 396 allows the clerk to enter in freehand a message to be sent to the floor broker. The message is automatically stamped with the time the that message is created and the badge number of the broker to whom the message is being sent.

Like the quote entry form, the memo entry form provides the clerk with a clear button 398, an escape button 400, and a send button 402. For example, in FIG. 6, the clerk has asked one floor broker to find another, perhaps because instructions or memos sent to that other floor broker were not being responded to. Thus, if broker "Jeff" from broker list 318 was sent an order to purchase certain stock and the clerk's station indicates that Jeff's hardware has not received the order, as explained more fully below, then the clerk might send a message to another broker, for example "Frank" asking Frank to locate Jeff.

C. The Handheld Device Display Screen

As noted above, the system comprises a base station and at least one handheld device. Each handheld device is provided with a display screen which is substantially equivalent to the broker status section 304 of the clerk management screen.

Figure 7:
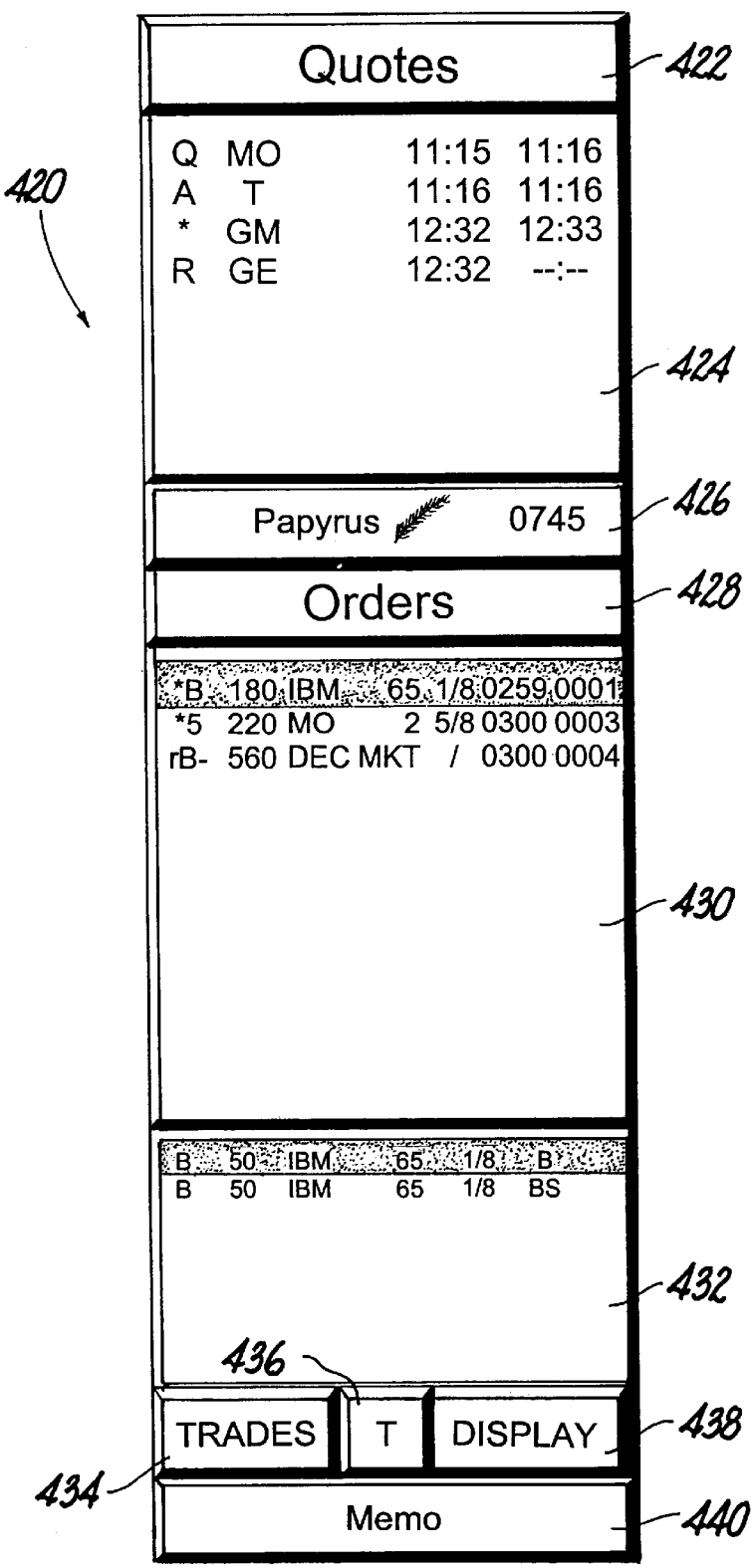
FIG. 7 shows a display screen for a handheld device in accordance with a preferred embodiment for displaying pending instructions that have been delegated to a particular floor broker, and also for displaying memos.

With reference now to FIG. 7, a handheld device display screen 420 is shown. From top to bottom, the display screen 420 includes an unsolicited quote call-up button 422 that blinks to alert the arrival of a quote request, a quote list display box 424, a scratch pad button 426, an incoming order alert 428, an order list box 430, a report list box 432, a trades button 434 for reviewing reports that have previously been sent to and acknowledged by the clerk, a "T" button 436 for causing tests routines to be transmitted, a display button 438 for selectively hiding and displaying the unfilled portion (leaves) of an orders in box 430, and a memo entry call-up button 440. Each of these features is described below.

D. The Handheld Device Data Entry Screens

Figure 8:
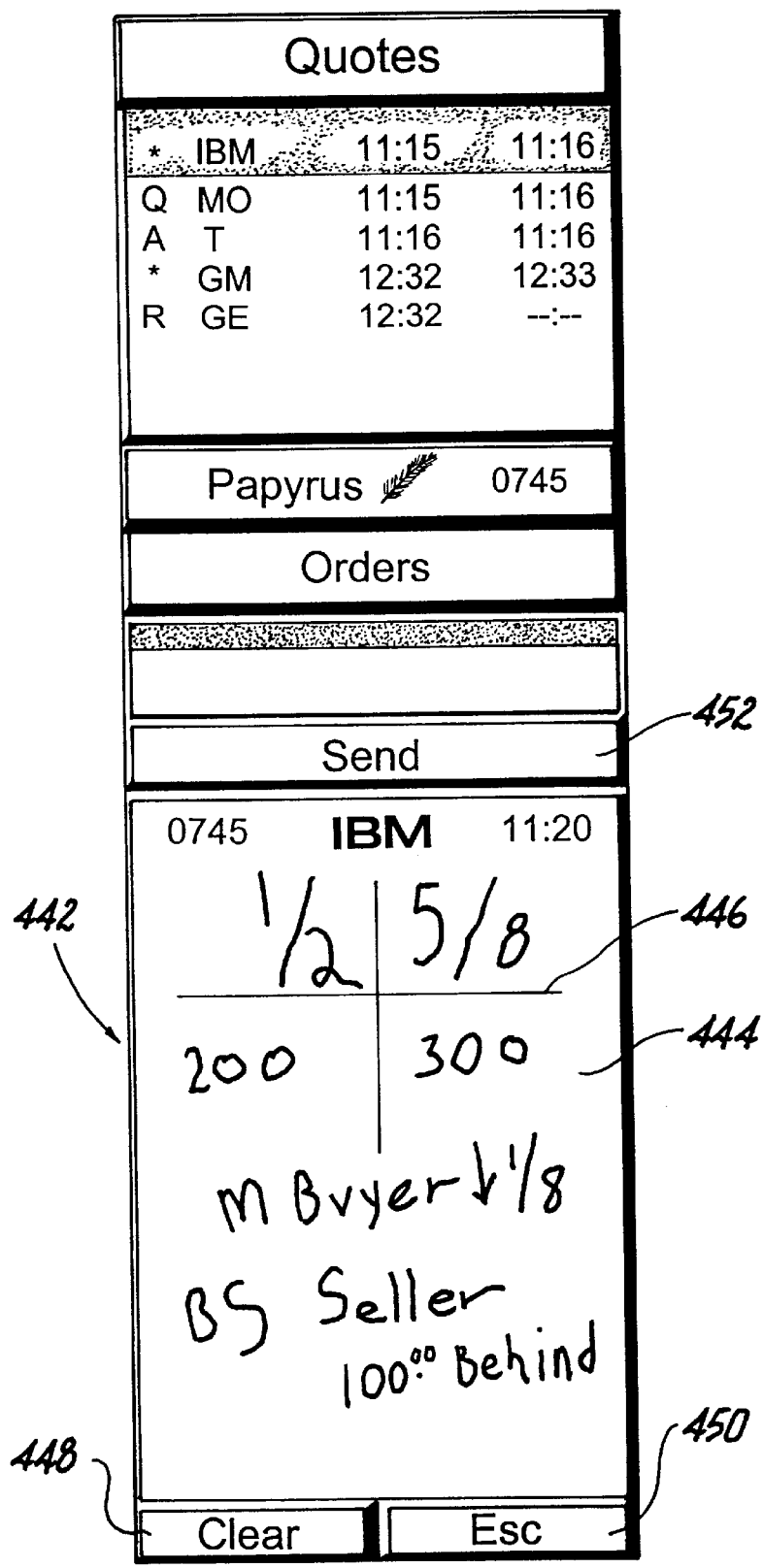
FIG. 8 shows the display screen of FIG. 7 with a quote entry screen overlapping a portion thereof, the quote entry screen being for formulating quotations in response to any received quotation requests, and for transmitting the quotations to the display screens of FIGS. 1 or 2.

The broker's display screen 420 in FIGS. 7 and 8 shows, among other things, that the quotation request entered by the clerk in FIG. 3 (at step 718 of FIG. 14) for the stock symbol "GE" has been received by the broker's hardware, but not yet acknowledged by the broker (see the last line of the quote list 424). The display screen 420 also shows (in FIG. 7 only) three order requests to be processed, including the order entered by the clerk in FIG. 4 for IBM (at step 730 of FIG. 14).

1. The Handheld Device Quote Entry Screen

A particular quote request is met by touching the screen at the location where the quote appears.

In FIG. 8, a quote entry form 442 has been called-up by touching the IBM entry in the quote list 424. The quote entry form 442 is illustrated on the bottom portion of the broker's display screen 420, although other positions are of course possible. This form 442 displays in its top center region the symbol for the stock for which a quote has been requested. Also, the time at which the broker has opened the quote request and the broker's badge number are automatically stamped on the form 442 in the upper corners. The quote entry form 442 is a substantially blank space 444 so that the floor broker can write the quote information using a pen-type input device, or even his fingernail. The handheld device, as noted above, responds to pressure applied to the surface of the display screens according to the program running on the device. A four quadrant grid pattern 446 may be provided in the blank space 444 to separate the bid, ask, buying interest, and selling interest in the stock.

As shown in FIG. 8, the broker has obtained quote information indicating that the stock IBM is presently trading at ½ to ⅝ (the whole dollar amount of the price being understood) with a buying interest of 20,000 shares and a selling interest of 30,000 shares. Apart from the transmission of the image of the quote slip, this information is conventionally available from quotation services such as ADP and Quotron. However, in accordance with an aspect of the invention, the floor broker is able to transmit the flavor or color of the market in the blank space 444. Here, the floor broker has conveyed that Merrill Lynch has a buying interest in IBM at a price ⅛ lower than the quoted spread, namely at 65 and ⅜ and that Bear Stearns has a selling interest of an additional 100,000 shares to sell that are not reflected in the selling interest noted in the conventional quote. As explained above, this insight is obtained from the trading crowd and is one of the benefits of the auction market which distinguishes it from so called "black box" markets (in other words, automatic order matching systems). This insight can cultivate trades through the continuous monitoring or awareness of trading interests beyond the official quote.

The quote entry form 442 further has a clear button 448 that permits clearing the screen and restarting, for example, in case of an error, and an escape button 450 that permits cancelling the quote report. When the quote is satisfactory, the floor broker presses a send button 452 to send it to the clerk.

2. The Handheld Device Report Entry Screen

Similar to the handling of quotes, a broker initiates the process of filling an order by touching the screen at the location where the particular order appears.

Figure 9:
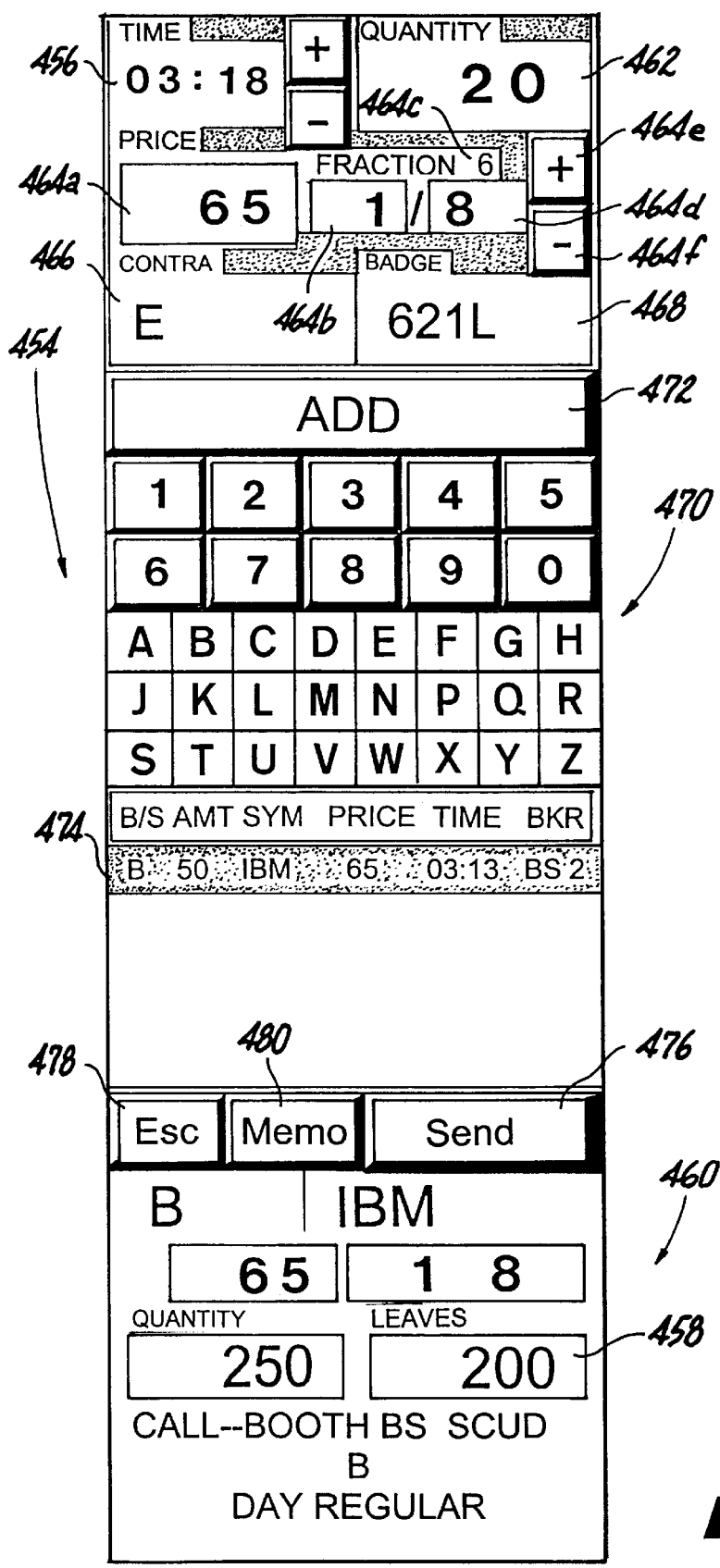
FIG. 9 shows a report entry screen of the preferred embodiment for formulating execution reports in response to any received orders, and for transmitting the reports to the display screen of FIG. 1.

FIG. 9 illustrates a report entry form 454 that has been called-up by touching the display screen 420 at the first line of the orders listed in box 430 (FIG. 7). When the report entry form 454 is called-up, a time stamp is placed on the report in a region 456. At the bottom of this form, the order information (stock symbol, side of transaction, quantity initially ordered, quantity required to fill order, limit price, and other terms) are displayed for the floor broker's reference. Of particular importance is a leaves quantity 458 which advises the broker of the quantity of stock required to be traded to fill the order. This is provided because the typical order to execution relationship is one to many, that is, an order is typically filled through several partial executions that need to be associated therewith. The entire order information section 460 may be selectively hid and displayed by touching the screen anywhere in this region. This allows the floor broker to preserve the secrecy of the quantity and terms of the order he is "working."

Figure 10:
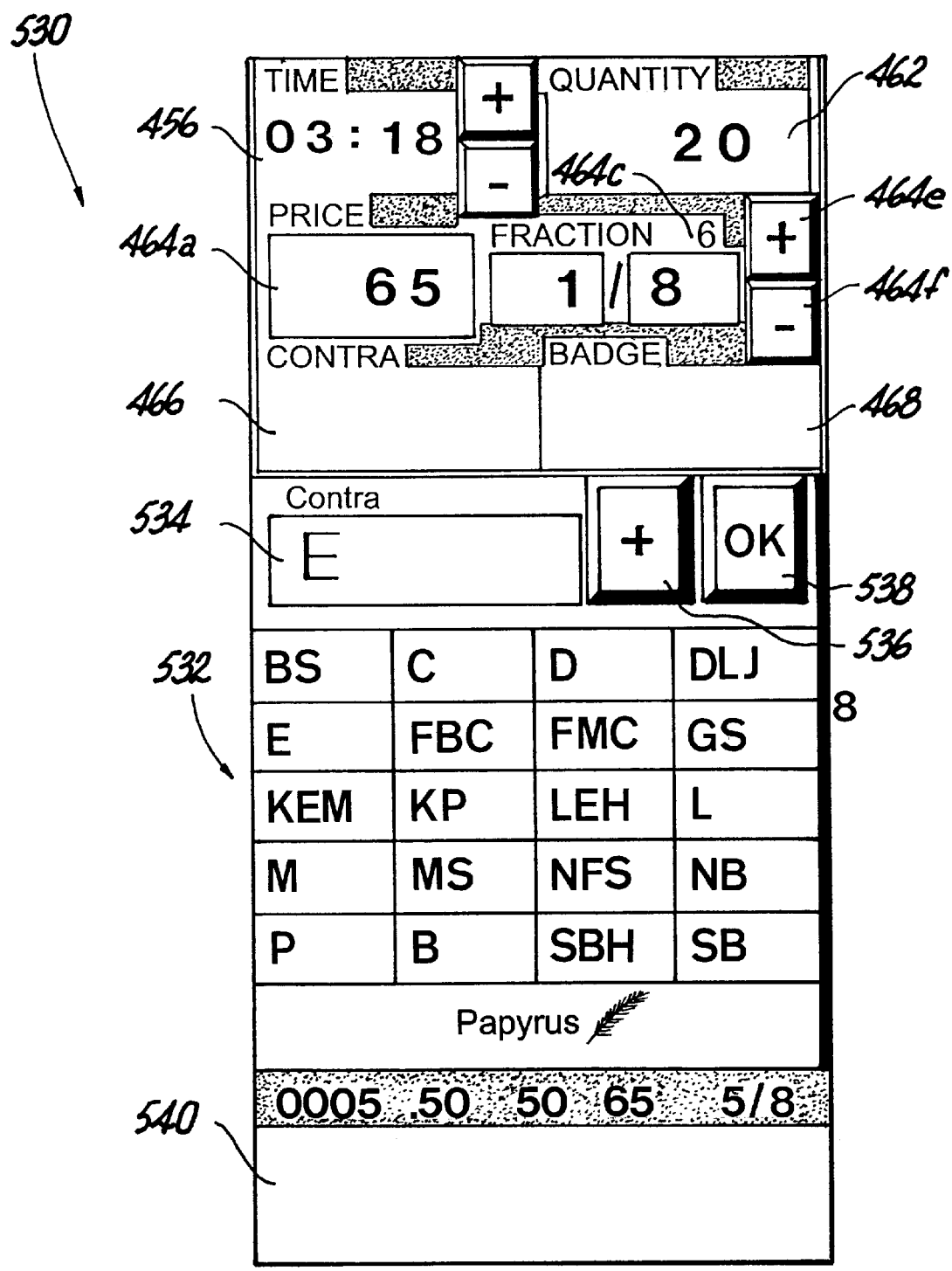
FIG. 10 shows a contra form screen with dynamic buttons for assisting in formulating an execution report.

To report a trade, the floor broker writes the quantity being purchased in a region 462, the price at which the trade has been done in regions 464a–f, a contra identifier region 466 and a badge number region 468 of the person with whom the floor broker is trading is also entered. The price defaults to any limit price shown in the information section 460, but may be adjusted as described above, in connection with the elements 374–380 of FIG. 4. Also, a contra broker box 530 may appear on the broker's screen, as shown in FIG. 10, to facilitate selection of a contra broker. The contra box 530 includes a plurality of dynamically changeable buttons 532 which may be touched with the pen-type input device (or fingernail) to cause the acronym for the contra to be inserted into the contra identifier region 466. The badge number of the selected contra broker 466 that was used the last time that contra was selected is inserted into the badge number region 468. The buttons 532 are changeable by writing a new contra identifier into a region 534, touching one of the buttons 532, and then adding the new contra button (or replacing an existing contra button) by pressing a plus button 536. An "ok" button 538 closes the contra box 530. The floor broker indicates that a trade is a crossed-trade, that is, the floor broker is crossing the present order with another one that with compatible terms in this box by touching the appropriate complementary side of the trade in that stock, which list is preferably sorted from the list of unfilled orders for all stocks that the floor broker is to trade and listed in a region 540 of the contra box 530. The badge number 468 is entered using a keypad 470.

Once this information has been entered, an add button 472 is pressed to complete the data packet (by defining its type and subtype, as explained in detail below) and add the execution in the form of a data structure to a list stored in a computer-readable memory of reports shown in a region 474 of the report entry form 454 (but not the region 432 of the broker display screen 420, because that region only shows reports of type/subtype ER, as understood in connection with the description of the volley codes below). In region 474 of FIG. 9, a report (of type/subtype ES) is listed which shows an execution of 5,000 shares of IBM against the order. The leaves box 458 has been adjusted to reflect this listed report. The report is sent to the clerk by pressing a send button 476. Prior to sending the report, it may be edited by touching the listed report in the region 474. An escape button 478 permits the floor broker to revert to the screen 420, and a memo button 480 permits the floor broker to attach a brief memo to the report, or to scribble private notes if the memo is not separately sent.

As shown in FIG. 9, an additional execution against the order of 2,000 shares is being entered into the floor broker's handheld device. Because that order has not been listed in the region 474, the add button 472 evidently has not been pressed. However, in FIG. 7 (box 432), these partial executions are shown to have been sent to and received by the hardware at the clerk station, in order of execution, with the most recent execution at the top of the list. As described below, the floor broker knows that the clerk station has not acknowledged receipt of these reports because the reports are still listed on his or her screen.

3. Transmission of Unsolicited Quotes

The broker can transmit an unsolicited quote when he or she encounters important information that, in his or her judgment, needs to be reported to an investor or the booth clerk.

Figure 11:
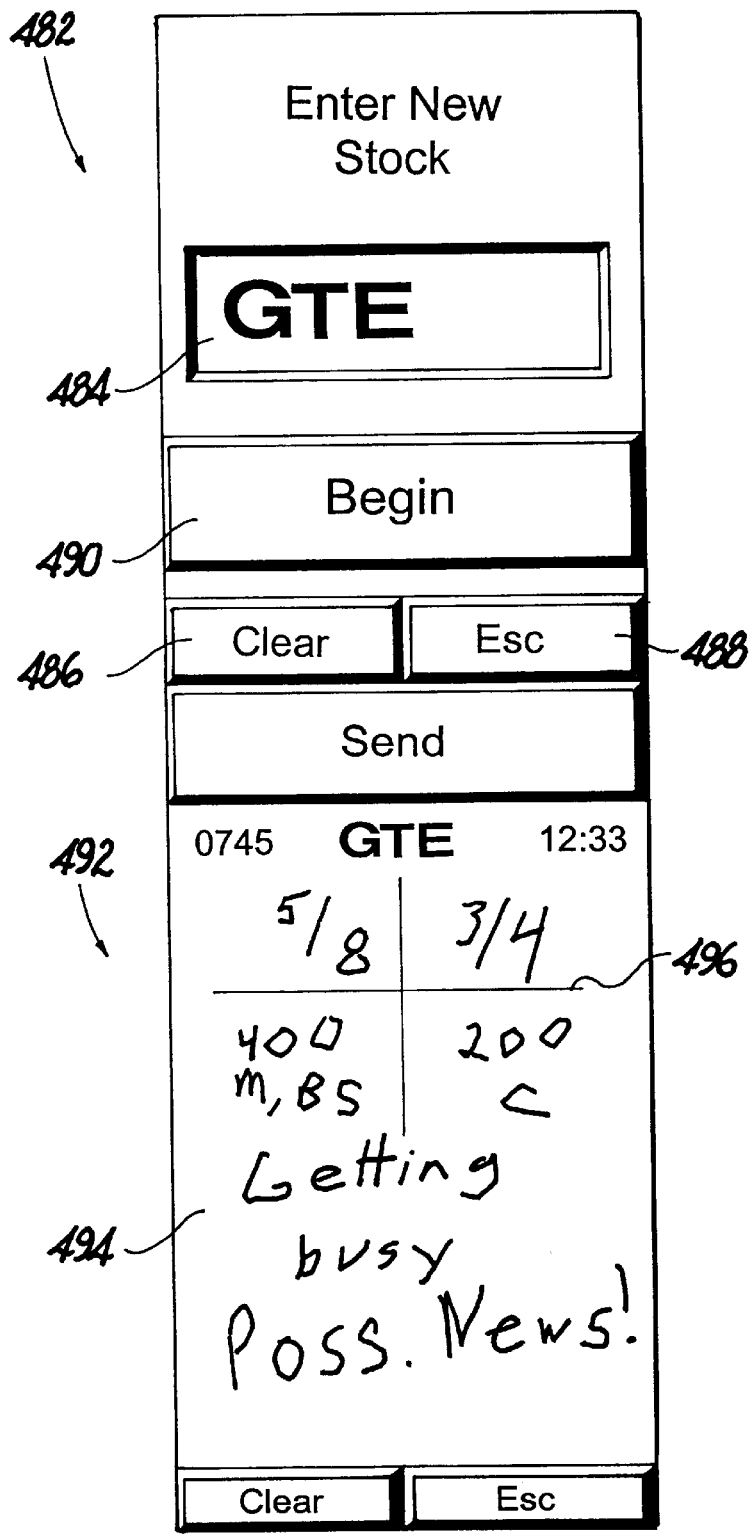
FIG. 11 shows an unsolicited quote screen of the preferred embodiment for formulating unsolicited quotes, and for transmitting same to the display screens of FIGS. 1 or 2.

By pressing the quotes button 422 on the broker display screen 420, an unsolicited quote entry form 482 of FIG. 11 pops-up. The form has a region 484 for entering a stock symbol, like the region 352 of FIG. 3. The floor broker can clear or escape from this form by pressing a respective one of buttons 486, 488. The unsolicited quote for the stock entered into the region 484 is then noted at the top of a quote pad after pressing a begin button 490.

By pressing the begin button 490, a quote pad is provided in a section 492 of the screen. The quote pad displays the floor broker's badge number, the time that the quote pad was opened, and the symbol of the stock for which the quote is being provided. The quote pad has a substantially blank region 494 and may be provided with a grid 496, for the reasons noted in connection with FIG. 8.

The floor broker enters the information to be sent in the blank space 494. In FIG. 11, a quote for GTE is shown. This quote indicates that Merrill Lynch and Bear Stearns represent the buying interest of 40,000 shares and that Cowen represents the seller of 20,000 shares. The comment "getting busy, possible news" conveys to the booth clerk that the volume of trading is increasing and that there may soon be news to report.

E. The Volley Codes

The system utilizes volley codes to define the present stage of a transaction or instruction. The transactions that may occur in the present system include the following: quote requests ("Q"), orders ("O"), executions ("E") (of orders), messages ("M"), status ("S"), and administration ("A"). These characters illustrate the "type" of instruction being processed, but not its stage.

In accordance with an aspect of the invention, a transaction progresses through a series of volley codes which identify to the operaters of the BS and HHD the stage of the transaction (order, quote, memo) at any particular moment in time. The stage of the communication between the BS and the HHD is known as the transaction "subtype." For illustrative purposes, the volley codes for the various transaction subtypes may be represented by the characters S (sent), R (received), A (acknowledge), * (live), Q (quote or response), E (complete or end of sequence), U (unsolicited quote), X (archive), C (cancel), D (delete), and P (pending replacement).

Of course, these characters are merely illustrative of the essential function of the system which they represent; other characters or digital means may be used to identify the progression of a communication from one device to another.

Figure 12:
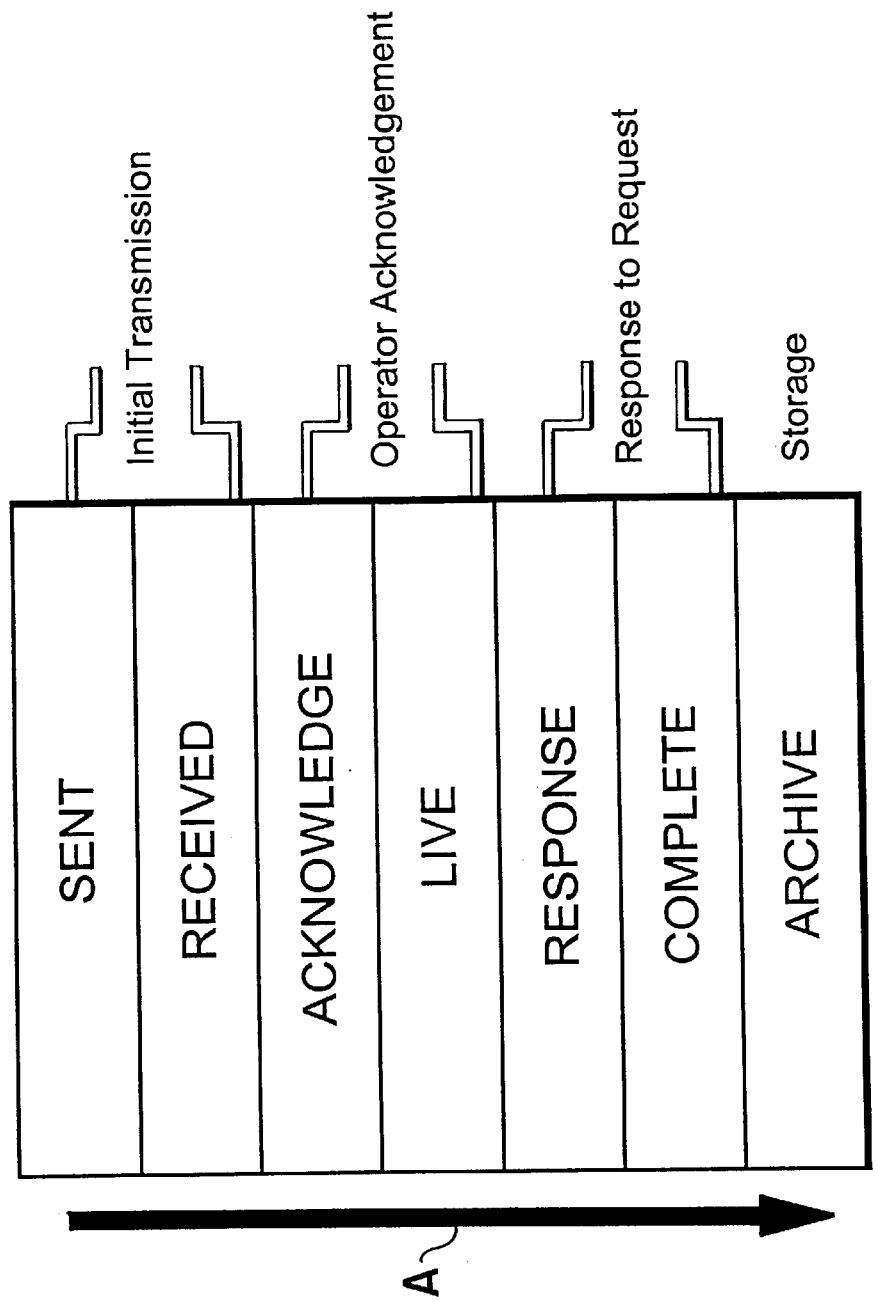
FIG. 12 is an illustration of the progression of volley codes that describe the stages of transmission of the instructions in accordance with an aspect of the present invention.

The progression among these codes is shown by arrow A in FIG. 12. The arrow indicates the progression among several of the principal subtypes for orders and quote requests as they are disseminated and handled. Memos are treated differently, as described below. The right margin of FIG. 12 shows the logical relationship among some of the subtypes. In particular, the sent and received subcodes (S and R), as a pair, logically define the initial transmission back and forth between the two wireless devices, the acknowledge and live subcodes (A and *) define the human or operator acknowledgement and machine response to the initial transmission, and the response and complete subcodes (Q and E) define the results obtained in response to the initial transmission.

1. Connectionless Service

Due to the abundance of electronics on the floor of a typical exchange, for example, the NYSE, the appearance of each new electronic device at the exchange has not been without concern for the potential interference—electrical or otherwise—with present or future devices. There is only a limited bandwidth available for transmitting devices within the exchange regulations, and available for public use under the Federal Communications Act. Unlike typical communication systems in which data is transferred according to a connection oriented protocol, the present invention exhibits enhanced performance characteristics—at least in terms of the number of handheld devices that can be supported in the limited transmission bandwidth environment available—by use of a connectionless protocol. See, W. S. Currie, LANs Explained: A Guide To Local Area Networks, p. 124, John Wiley & Sons, New York (1988).

Thus, in accordance with a further aspect of the present invention, the virtual circuit that is conventionally established between the two communicating devices (connection establishment, followed by data transfer, and finally connection termination) is dispensed with, in favor of a system that transmits data (instructions) without an established connection. Like the U.S. Postal Service's regular mail, there is no guarantee of delivery, nor is there any indication of the success or failure of the transmission. Nevertheless, like regular mail, most of the mail arrives at the destination without incident. As a result, the overhead of establishing and terminating a connection is avoided entirely, thereby effecting an overhead savings of approximately eighty percent since most of the data used in the inventive system are stored in a computer-readable memory as a data structure which can be transmitted as a single data packet, that is the smallest data unit that can be transmitted using the Proxim RangeLan hardware. Connectionless service has generally been an unacceptable protocol where the sender and receiver need to know that the information was received or handled, such as at the stock exchanges. Nevertheless, the reduction in overhead is an attractive feature when numerous persons need to transmit over a limited bandwidth. For example, the floor of the NYSE may have two thousand floor traders on the floor at one time, each of which may be receiving instructions and transmitting handled responses.

A further inventive aspect of the invention resides in the construction and transmission of echo signals that are only transmitted when required. An echo signal is required in the present system whenever there is a need for the operator of either the base station or the handheld device to know the status of a transmission. These signals are constructed by transforming or altering incoming signals into an altered signal which is representative of a signal with a volley code of a different or higher value. The term "altered" is intended to embrace separately constructed signals that bear no prior relation to the "unaltered" signal, yet nevertheless possess a volley code of different or higher value. Volley codes of higher value are closer to the arrow head A of FIG. 12 than the previous volley code. In this manner, when one of the booth clerk and floor broker sends an instruction to the other's terminal, the sender knows: first, that the other terminal's hardware received the instruction, second, whether the user at the other terminal has acknowledged awareness of the instruction, third, the response to the instruction; and fourth that the recipient has properly archived the instruction for audit purposes. On the other hand, the receiver is advised that the sender knows he or she has acknowledged the message (the live prompt "*"), and that the response has been seen by the sender (the clearing of the instruction from the recipient's screen).

As used in this specification, an echo or altered signal includes the data packet of the original data structure, except for any image data, with the subtype volley code altered or transformed, so that a single data structure may be retransmitted or echoed to the sending device. An echo signal does not include image data, for example, data packets of type/subtype QQ, because image data requires the transmission of more than one data packet.

2. The Data Structure

A data structure according to one aspect of the invention is shown in pseudocode below:

```
struct. telepathy}
    /* ---------- quotes, orders, and executions ------------ */
    char            badge[PACK_BADGE];        /* badge number of broker */
    unsigned int    seqNum                     /* transaction sequence number 0001–9999 daily */
    char            transType;                 /* type of transaction
                                                   Q - Quote
                                                   O - Order
                                                   E - Execution
                                                   M - Message
                                                   S - Status
                                                   A - Administration */
```

-continued

```
    char          transSubtype;              /* subtype (status) of transaction:
                                                Quotes
                                                    S - Start new transaction sequence
                                                    R - Received new quote at handheld
                                                    A - Acknowledge quote read by trader
                                                    * - Quote now live on floor
                                                    Q - Quote done, being transmitted from floor
                                                    E - End of transaction sequence
                                                    U - Unsolicited from floor
                                                    X - Archived quote (relayed to trader)
                                                Orders
                                                    S - Transmit new transaction sequence
                                                    R - Received new quote at handheld
                                                    A - Acknowledge quote read by trader
                                                    * - Order now live on floor
                                                    Q - Order done, being transmitted from floor
                                                    E - End of transaction sequence
                                                    U - Unsolicited from floor
                                                    C - Cancellation request of order
                                                    D - Deleted order
                                                    P - Pending replacement order */
    char          stockSymbol[PACK_SYM];     /* stock symbol */
    char          date[MAX_DATE_TIME];       /* date of transaction MM/DD/YY, Mark 5-02 */
    unsigned long time;                      /* military time to seconds.HH:MM:SS */
    /* ----------- orders and executions ------------ */
    unsigned char orderBuySell;              /* buy, sell, sell short, plus minus */
    unsigned int  quantity;                  /* amount of order */
    int           price;                     /* whole part of price. "–1" - market.{MKT}*/
    int           fraction;                  /* fraction part of price, baudot format. */
    char          giveUp[MAX_GIVEUP];        /* who to give up on the trade. */
    char          contraBadge[MAX_CONTRA];
    unsigned int  fillSeq;                   /* used to match fills to orders */
    unsigned int  executionSeq;              /* used to match executions to order */
    /* ------------ orders only ------------*/
    char          customer[MAX_CUSTOMER];    /* customer on the trade */
    unsigned char allOrNone;                 /* execute all or none of the order */
    unsigned char ordType;                   /* type of order: stop, mrkt, etc. */
    unsigned char ordDuration;               /* order in effect for: GTC, DAY, etc. */
    unsigned char ordDelivery                /* delivery instructions: cash, next day */
    char          note[MAX_NOTE_SIZE];       /* memo string with NULL */
    };
typedef struct telepathy RADIOPACKET;
/* Size of packets (to maximize telepathy's use of the air) */
/* was 32, 59, 88, 88 */
#define QUOTESIZE    (28 + 4)
#define EXECSIZE     (49 + 10)
#define ORDERSIZE    (78 + 10)
#define MAXPACKSIZE  (78 + 10)
```

The data structure includes a header with each of the data packets. In one aspect, the header identifies the type and subtype of the instruction: transType/transSubtype. Certain information is always transmitted in the header regardless of whether the communication originates at the BS or the HHD. That information includes the badge number of the floor broker, the sequence number of the transaction, the transaction type and subtype, the stock symbol, date, and time. The badge number is a unique identifier used to identify the broker who is on one side of a trade or who is reporting a quote. The sequence number is used as a reference for grouping related communications (instructions). For example, a quote request and the response thereto will be assigned a common sequence number. Likewise, an order and a series of partial executions against that order, will share a common sequence number.

The transaction type portion of the header guides the execution of the program by indicating which aspect of the system is being called upon at the present time. For example, an order causes certain program steps execute, whereas a memo causes different steps to execute. An echo signal is constructed by transforming or altering the transaction subtype of the foregoing data packet construction. Together, the transaction type/subtype describe the nature of the data packet being transmitted and indicate how the data should be handled by the system. Hence, the transaction subtype may progress with each stage of the communication. Of course, the method of the present invention can be used with equal advantage and facility with other transaction types and subtypes, as understood by those skilled in the art.

As seen in the data structure, the variable that accommodates the sequence number is an unsigned integer. Such a variable can assume over 10,000 different values, which should be sufficient for any trading day.

For purposes of establishing an audit trail, the data contained in the time field of the header varies with the subtype of the transaction. Hence, the data packets that are formulated for each of the QS, QR, and QQ stages of the communication, as defined by the above data structure (where the first character denotes the transType and the second character denotes the transSubtype), will respectively contain the time that the quote request was initially constructed, the time that the hardware of the HHD received the quote request, and the time that the quotation was obtained. Similarly, the time field for each of the OS, OR, OA, etc. stages will contain the time that that stage of the transaction occurred. At the close of a trading day, these times can be used to confirm that trades were transacted within prescribed regulations from the time that an order was placed to the time that the execution was reported, and for other audit purposes.

The data that accompanies the header in a fully constructed data packet differs depending on the type of the instruction; nevertheless, as can be appreciated from the pseuodocode above, each data packet that is formulated or constructed is stored in a computer-readable memory, and may be transmitted across a two-way a wireless network, as a data structure.

a. Data Packet: For Requests For A Quotation

A request for a quotation need only contain the basic header information which, as noted above, includes the badge number of the floor broker selected to obtain the quote, an assigned sequence number for the transaction, the transaction type (which in this case is "Q") and subtype (which progresses, as described below), the stock symbol, date, and time.

b. Data Packet: For Quotation Responses And Memos

When a floor broker obtains quote information on a particular stock, it is communicated by creating a data packet of type QQ or UQ, depending on whether the quote is in response to a quote request or whether the quote was unsolicited.

The data that comprises these types of data packets consists of the foregoing basic header information, as well as binary data that represents an image scrawled on an electronic sheet, such as in blank spaces 444, 494 of FIGS. 8 and 11, respectively. The binary data is stored in one of several data packets for transmission to the clerk station, or some other station. The basic header of each of the packets is modified to indicate which packet in a series of packets the image data pertains to, so that the image file may be reconstructed at the receiving end.

The same is true of the memos, such as scrawled on memo entry form 396 of FIG. 6.

c. Data Packet: For Orders And Executions

The data packets constructed for transmitting orders and execution reports do not include image data. However, such data packets include information beyond the basic header information that accompanies a request for a quote.

For transactions of type order ("O"), all of the information that is entered into the order entry form 360 is transmitted as well (see FIG. 4). This information includes the type of order (buy, sell, sell short, etc.), the quantity of shares to trade, the price (market or limit price), the give-up on the trade, the customer, the terms of the trade, and any further memos that might be required, as previously described in connection with the order entry form. Together with the basic header information, this comprises the order data packet.

When a data packet for an execution is constructed, the contra badge, fill sequence, and execution sequence fields are further required. The contra badge field includes either the badge number of the other broker involved, or, in the case of a cross-trade, the sequence number of the order in the floor broker's deck that is being matched. The contra badge number or sequence number for cross-trades are entered in the box 466 (see FIGS. 9 and 10). The fill sequence may be used as a pointer to trades that have been entered into the HHD, but not yet reported to the investor. Because the customer, terms of the order, and any attached notes are not germane to the executions against that order, that information is omitted from the execution report data packet.

3. The Volley Code Progression

Many of these characters are displayed on the screens of the BS and HHD at the appropriate stage of the communication protocol to reflect the current stage of communications. However, some of these volley codes, for example, the end of sequence E code, are system codes that need not ever be displayed to the user.

With reference to FIGS. 1–11, the volley codes are described in detail from the perspective of an instruction being sent from a base station, such as one operated by the booth clerk, to the handheld device, although the invention is not so limited. The description is also apt to describe instruction transfers from a handheld device to a base station, one handheld device to another, or an investor's personal computer to a handheld device on the floor of the exchange. Further, the instruction and progression of its handling may be transferred from the HHD to a trading desk (or vice versa) by way of a clerk station, the clerk station in this case serving as a conduit for the instruction.

Box 324 of FIG. 1 depicts the volley codes S, R, A, *, Q, and U for several different stocks for which the booth clerk has requested a quote from broker "Rich." The quote requests for the other brokers listed in the broker list 318 are not presently being displayed, but can be displayed by touching the line of broker list 318 of the broker whose pending status is to be monitored. Each of the volley codes described below are with respect to an instruction of type "Q," a request for a quote.

Figure 13:
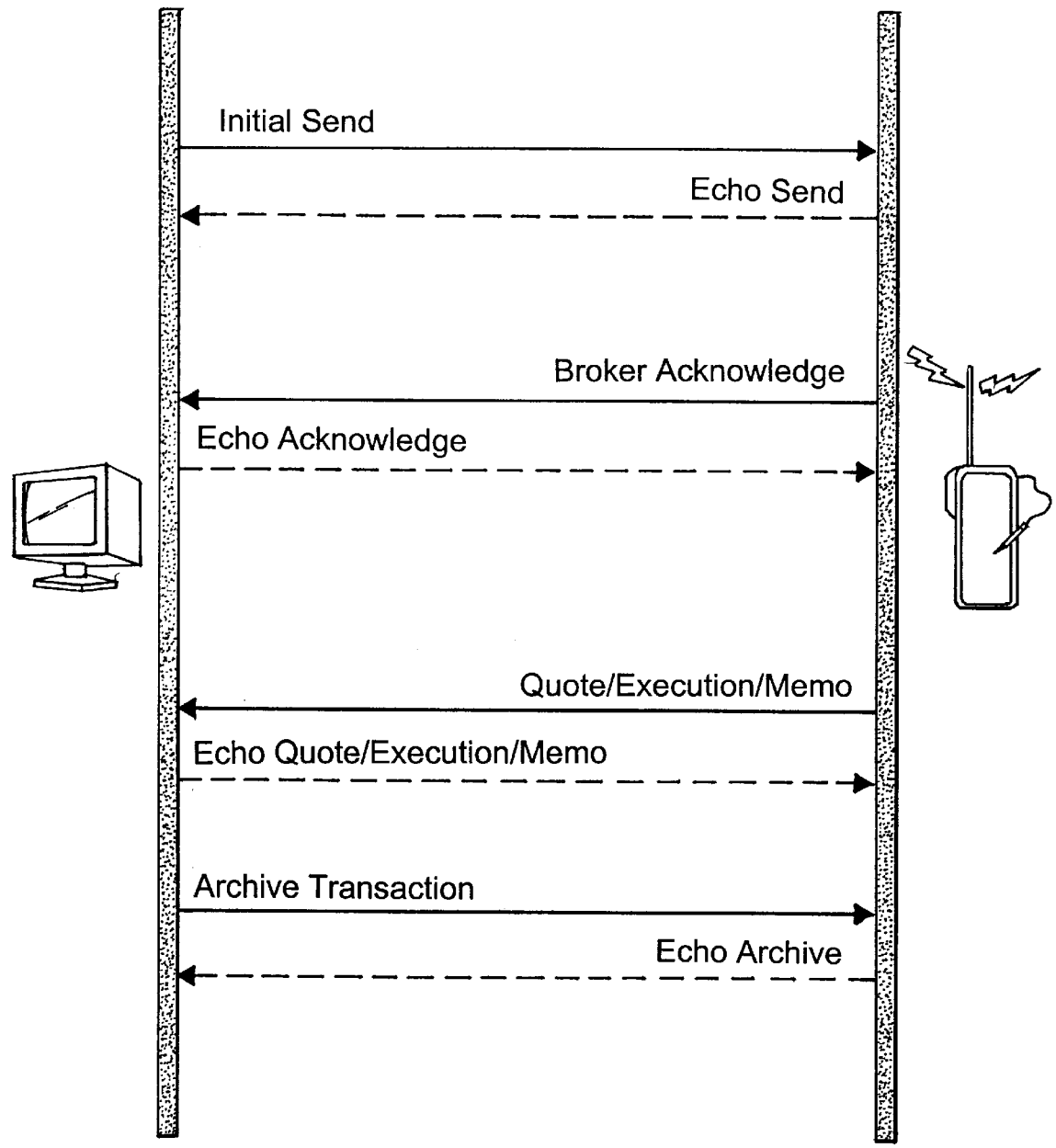
FIG. 13 is an illustration of the signals generated by human intervention and the echo signals generated automatically in response thereto, in accordance with an aspect of the present invention.

The "S" volley code indicates that an instruction has been sent from the BS to the HHD concerning stock symbol "F" and that the hardware of the HHD has yet to acknowledge receipt of the instruction. When the hardware of the HHD acknowledges receipt of the instruction, an "R" volley code will appear to the left of the stock symbol "F." This next stage of communication is shown with respect to the quote request sent to and received by the hardware of the HHD for the instruction concerning the stock symbol "GE" (note the "R" code). The "R" code is generated automatically as an echo signal by the hardware of the HHD by transforming or altering the transaction subtype "S" portion of the data packet and echoing the data packet back to the device that originally sent the instruction. Hence, for substantially all communications, the sent code ("S") rarely appears on the display of the sending device because the hardware of the device receiving the instruction immediately responds with the received code ("R"), and the received code supplants the sent code on the display screen of the sending device. The echo signals that are automatically generated without manual intervention are shown in dotted arrow form in FIG. 13.

Assuming that the "R" code is received at the BS or sending device, it will remain on the display screens of each of the HHD and BS until the operator of the HHD manually acknowledges that he or she has noticed the received instruction. For example, for the quote request for the stock symbol "GE," the clerk shows an "R" code in the quotes box 324 of FIG. 1 and the floor broker shows the "R" code in the quotes box 424 of FIG. 7. As a result, the clerk knows that the instruction has been received by the hardware device in his or her selected floor broker's hand.

The operator of the HHD manually acknowledges receipt of the instruction by touching the line of box 424 that shows the incoming quote with the "R" code. This causes the "R" code to change to an acknowledge or "A" code (as shown for the stock symbol "T") and causes the hardware of the HHD to transmit the acknowledge or "A" code to the BS. Upon receipt of the acknowledge code, the BS supplants its received "R" code with the acknowledge "A" code, so that the booth clerk is now informed that the floor broker has seen the instruction received by the hardware device in the floor broker's hand.

It is possible that the received code "R" has not been received at the sending device due to communication problems. Nevertheless, in accordance with an aspect of the present invention, the floor broker may acknowledge a received instruction with an "A" volley code, even if the booth clerk's BS or other instruction originating station has failed to receive an echo data packet and has therefore not been apprised that the instruction has been received (that is, still displays an "S" subtype volley code, for example, the Ford Motor Co. stock). This is possible because the system accepts incoming data packets as long as they have a subtype of greater hierarchical value than the last received data packet having the same sequence number. The hierarchical values are in the order shown in FIG. 12, with higher values ascribed in the direction of the arrow A.

In response to an acknowledge code "A," the BS echoes a live code "*" to the HHD by transforming or altering the data packet as previously described. The hardware of the HHD automatically updates the acknowledge code "A" to the live code "*." The live code "*" displayed at the HHD advises the floor broker that the booth clerk's BS or other instruction originating station has been apprised of the fact that the operator has seen the instruction and that it is now pending. For example, the stock symbol "GM" is shown in boxes 324, 424 to be in the pending or live "*" stage.

To handle the pending instruction, the floor broker touches any of the live "*" quote requests. In FIG. 8, the live quote request for the stock symbol "IBM" has been touched, which has caused the quote entry form 442 to pop-up, with the stock symbol "IBM," broker badge number, and the time, as previously described. When the quote has been entered and the send button 452 is pressed, a data packet of type/subtype QQ is constructed and sent to the clerk station. At the same time, the subtype volley code "Q" supplants the live code "*" at the HHD.

The clerk station displays the received quotation as subtype Q, as shown for the stock symbols "IBM" and "MO." When the clerk acknowledges receipt of the received quote, as by touching the "Q" code quote listed in box 324, the header is echoed back to the HHD with a type subtype "QE." Rather than displaying this volley code at the HHD, the subtype "E" instructs the HHD to remove the quote request from the quote list 424. In FIG. 7, the clerk station has acknowledged receipt of the quote for "IBM," but not "MO." As a result, the request for a quote on the stock symbol "IBM" is removed entirely from the floor broker's display of pending instructions, but the floor broker's screen still indicates that the clerk has not acknowledged receipt of the quote for the stock symbol "MO." In this manner, the floor broker has fewer pending instructions on his or her display screen, and the booth clerk can monitor or manage the progress of each of his or her floor brokers.

An archive signal for the same data packet, but of type/subtype "QX" may be further transmitted to the HHD so that the HHD is advised that the quote is to be archived locally. An archive echo signal may be echoed in response, in the same manner as the previously described signals.

Unsolicited quotes are handled somewhat differently because they originate at the HHD. As described above, the floor broker may transmit an unsolicited quote when he or she encounters important information that, in his or her judgment, needs to be reported to an investor or the booth clerk. The floor broker constructs an appropriate data packet using the unsolicited quote entry form 482 such as shown in FIG. 11. This data packet is transmitted as type/subtype QU and contains a sequence number that is subject to change because there exists the possibility that the identical sequence number has been transmitted more or less simultaneously by the booth clerk's BS or other instruction originating station.

To resolve this potential conflict situation, an arbitrary sequence number is initially included in the data packet originated by the HHD to identify the communication. Preferably, this sequence number is selected to be above 7000, or a number that is unlikely to be reached during the trading day. A successive sequence number from that HHD would have a different arbitrary sequence number, for example, 7001, 7002, etc. This logic may be used whenever the instruction originating device is not specifically charged with the responsibility for assigning a unique sequence number to the instructions.

This arbitrary sequence number is replaced with the correct or present sequence number for that floor broker when the clerk station echoes the receipt of the unsolicited quote. The echo signal advises the HHD of the correct sequence number. The HHD notes the correct sequence number, archives the unsolicited quote, and echoes back the correct sequence number so that the clerk station can archive the quote.

The progression of volley codes for instruction of type "O" (orders) is substantially the same as previously described. As shown in FIGS. 1 and 7, the order to buy 56,000 shares of the stock symbol "DEC" has been received at the HHD, but not yet acknowledged as having been seen by the floor broker, whereas the orders relating to the stock symbols "IBM" and "MO" have been manually acknowledged by the floor broker and the clerk station has echoed the acknowledgement so that these orders now have a live "*" status.

In an attempt to minimize the number of signals transmitted to convey memos, and to discourage the use of the memo feature for transmitting instructions that require an audit trail (quote requests, orders, executions, etc.), there is no progression of volley codes for memos. Rather, once a memo data packet is constructed, as by use of memo entry form 396 of FIG. 6, it is sent and no acknowledgement (echo) is provided. As noted above, the present invention reduces overhead in signal transmission by sending instructions without first establishing a connection, and therefore there is no need to terminate any connection that has been established. Rather, because the wireless transmission occurs within the four walls of the exchange to one or more of the radio bridges that are connected to the backbone LAN, there is a virtual certainty that the transmission will be received at the other hardware device. In the preferred embodiment, the radio bridges may be RangeLan 2 Access Points.

4. Retransmission of Unanswered Signals

In the unlikely event that a transmitted signal is not echoed or acknowledged within a predetermined period of time, the signal is repeated a predetermined number of times until the expected reply is received. An expected reply may be the particular echo code for the signal just sent (see FIG. 13) or a signal having a volley code of greater hierarchical value (see arrow A of FIG. 12).

5. Cancellation of Orders

There are times when an order which has already been sent to the HHD for handling by a selected floor broker should be canceled or modified. For example, the clerk may have erroneously entered the price, quantity, or terms of the order, or the investor may have reconsidered the order altogether. If the floor broker has not already completely filled the order, the order may be canceled or modified.

By pressing the cancel button 314 on the clerk's management screen, followed by the particular order in orders box 328 that requires cancellation or modification, an alert signal is transmitted to the previously selected broker to whom that order had been delegated. This alert signal causes an alert box open on the floor broker's HHD. This alert box preferably occupies the floor broker's entire screen. He or she must therefore acknowledge that there is a pending cancellation or modification of one of the floor broker's orders prior to entering any executions, or making any other use of the HHD. The alert signal further causes the type/subtype of the order that is subject to cancellation or modification to change to "OC" to indicate that an order change request is forthcoming. This is true regardless of the present type/subtype, which may be any one of "OS," "OR," "OA," and "O*."

Immediately after transmitting the alert signal, the clerk is presented with a cancel/modify screen. This screen is substantially the same as the order entry form 360 of FIG. 4, except that each of the entries 364–389 is filled with the data from the data packet of the order for which the cancellation request has been made. These data constitute default values, any of which the clerk can change, for example, the price, terms, and quantity, to effect a modification of the previously transmitted order. For example, if the investor changed his mind about the trade, the clerk would enter zero into the quantity region 370. When the clerk is done making the changes to the previously transmitted order, he or she presses the send button 362 to construct a data packet.

The transmitted modified order is sent as a data packet of type/subtype "OP" to indicate a pending replacement for a previously transmitted order. The association of the modified order to the previously transmitted order is made through the use of a common sequence number. The transmitted modified order causes a further screen to appear on the broker's HHD. This screen displays the changed terms of the modified order as compared to the previously transmitted order, and requires the floor broker to either acknowledge that the changes can be made ("ACK") or that it is too late to cancel ("TLC") that order because the broker has already made partial executions against it. The selection between ACK and TLC is returned to the clerk in the form of a data packet.

If the floor broker has indicated that the order may be canceled, then the status of the previously sent order is changed at each of the BS and HHD from "OC" to "OD." This causes the trade to be archived with the contra broker of the trade entered as "cancelled." The clerk's station then alters or replaces the data packet of type/subtype "OP" to "OS" and assigns a new sequence number to the order, so that when the replacement order is sent, it is processed as a new order.

On the other hand, if the floor broker has indicated that it is too late to cancel the order, then the status of the previously sent order is changed back from "OC" to "O*," regardless of its previous stage, because it is clear to the clerk that the broker has acknowledged having seen the order. Similarly, the modified order "OP" is erased as an unconfirmed change request.

6. Secondary Transmissions

If for some reason the recipient has not acknowledged the instruction, the sender can use an alternative means for notifying the recipient of the instruction, for example, by paging the recipient or by calling the recipient on a cellular phone. In the preferred embodiment, this is performed automatically after a predetermined period of time, as shown at steps 839, 889 of FIGS. 17 and 18, respectively. The clerk, for example, can page the selected floor broker by pressing the beep button 308 on the management display screen 300 (see FIG. 1).

F. Example

With reference now to FIGS. 14 through 18 the method of the present invention is traced by way of example.

1. Creation Of Outbound Instructions

Figure 14:
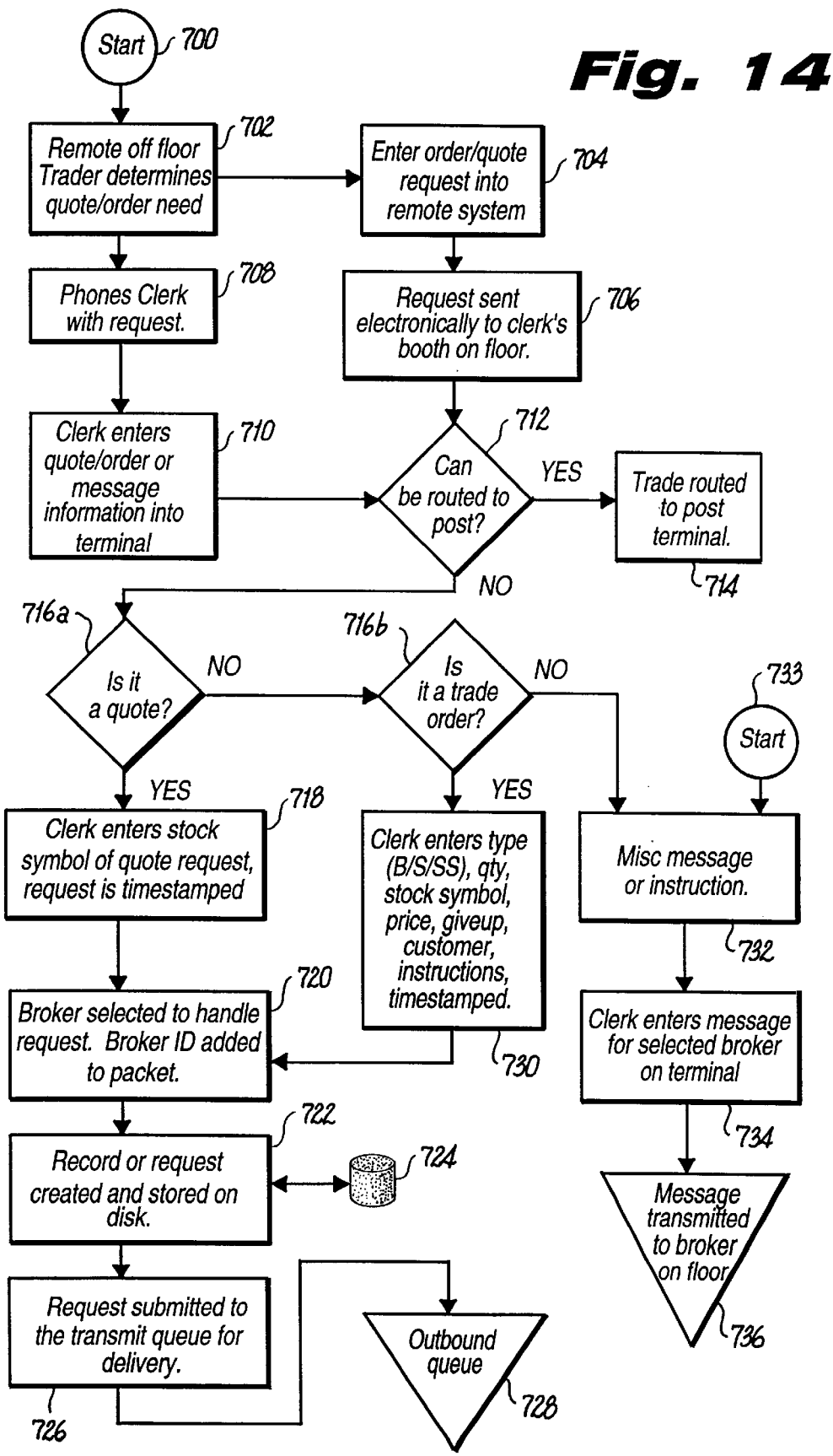
FIG. 14 is a flow diagram of the actions that may be taken to create instructions in the form of data packets at a base station in accordance with a preferred embodiment of the present invention.

A typical transaction is seen to start in FIG. 14 at step 700. At step 702, an investor or off-the-floor trader has either a quote request to make or an order to place in the form of an "instruction." This instruction is forwarded to the floor of the exchange by entering it at step 704 into a BS, as previously described in connection with FIGS. 3 and 4. It is sent at step 706, in this example, by pressing buttons 354 or 362 (see FIGS. 3 and 4). Alternatively, the investor may call the booth clerk with his instruction (at step 708), so that the clerk enters the instruction, as shown at step 710. In either case, the particular instruction is examined at step 712 to see if it is an order that can be sent directly to the post, as shown at step 714.

If the instruction is one that should be handled by a floor broker, the clerk (programmed machine or other person entering in the instruction) notes whether it is a quote or an order at steps 716a,b. The programmed machine can make such a determination by reviewing the type code. Alternatively, the clerk may have a miscellaneous message to relay to the floor broker, also shown at step 716b.

If the instruction is a request for a quote, at step 718, the clerk selects a floor broker to handle the instruction from the broker list 318 at step 720, and then presses the quotes button 326 to call-up the quote entry form 350. The clerk enters the stock symbol into the quote entry form 350. The system automatically attaches the broker badge number and the time to a data packet that has been constructed at step 722. A record of the constructed quote request is stored on a storage device at 724. The stored record is submitted to a transmit queue for delivery to the selected floor broker, as shown at step 726. The outbound queue noted at 728 is described with reference to FIG. 15.

On the other hand, if the instruction is an order to buy or sell a particular security, the clerk enters the order information at step 730 instead of the quote information at step 718. Otherwise, the process is the same: the clerk selects a broker at step 720, constructs the appropriate data packet at step 722, stores a record of the order at 724, and submits the order to the transmit queue for delivery at step 726.

Finally, if the communication is merely a miscellaneous memo to be relayed to a particular floor broker, as at step 732, the clerk starts the memo process at 733 and enters the memo for a particular broker, using the memo entry form 396 of FIG. 6, as shown at step 734. The memo is submitted to the send routine of FIG. 15 at step 736, without creating a record or storing same.

2. The Send Routine

Figure 15:
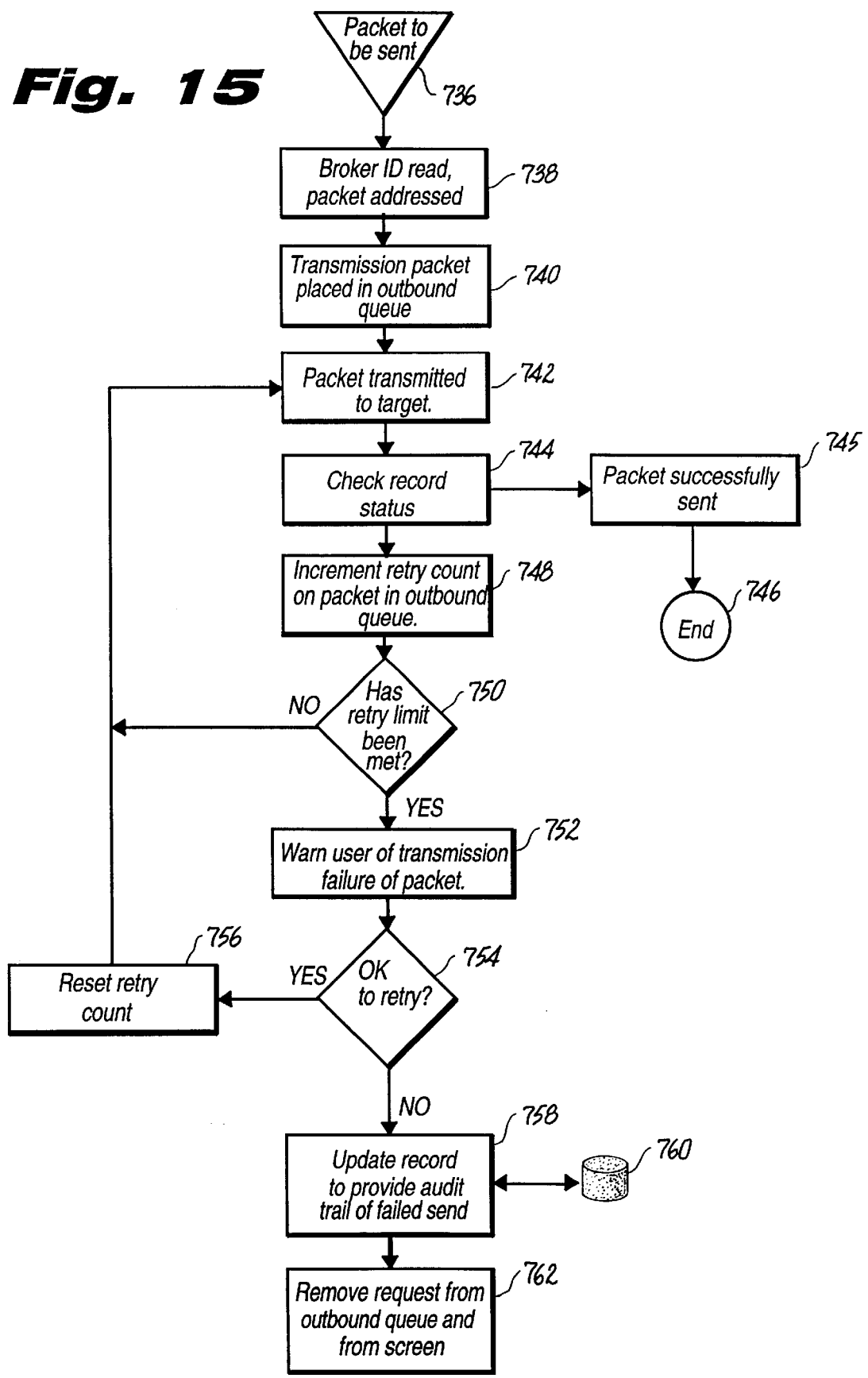
FIG. 15 is a flow diagram of a send routine used to transmit instructions in the form of data packets in accordance with a preferred embodiment of the present invention.

All data packets that are to be transmitted, either from the BS or the HHD, are handled by the routine illustrated in FIG. 15. In FIG. 15, the packets to be sent that are received at 736 are, for example, the packets prepared for the outbound queue at step 728 of FIG. 14. The network address that identifies where the packet is to be sent is obtained from the broker badge number. At the beginning of each trading day, a broker is assigned a particular HHD for use. The broker signs onto the system by associating his or her badge number with a unique serial number or other identifier of the HHD hardware. In this manner, before sending an instruction to the floor broker named "Rich," the system determines which HHD Rich is using and then uses that address to send him instructions. This address search need only be performed once each day; however, in the preferred embodiment, the address is periodically reviewed in case Rich (or some other floor broker among perhaps 2,000) uses a different HHD after lunch, or because of battery failure, etc.

The packet is provided with the address of the selected broker at step 738 and placed in the outbound queue at step 740 for transmission to the addressed device at step 742. After the packet has been transmitted, the system checks the status of that particular data record at step 744 to see whether a response to the transmission has been received or is required. If a response has been received, such as an echo signal, then the send routine has accomplished its task, that is, it has successfully sent the data packet (at step 745) and ends at 746. Likewise, if no response is required, as when a received "R" or live "*" code is being-transmitted, then the routine proceeds to step 746, having only attempted the transmission once. If the status check does not reveal an acknowledgement that the packet has been successfully transmitted to the target (addressed device), then a retry counter is incremented (at step 748) and the packet is retransmitted at step 750, provided that a predetermined retry limit has not been met. A retry limit of three is the preferred limit on the number of times that an instruction is sent without causing a warning to appear that the packet was not able to be transmitted. Such a warning is provided at step 752. Also, it is preferred that instructions of type message "M" are only transmitted once, without retrying the transmission because it is also preferred that not be an echo signal generated which can be checked at step 744.

If a warning screen is presented as at step 752, the operator of the device that is attempting to send the instruction can confirm that it is alright to continue trying to send the data packet at step 754, in which case the retry counter is reset at step 756 and the process returns to step 742. Otherwise, the operator of the sending device is notified of the failure to be able to send the data packet at step 758 and the record of this is stored at step 760. Finally, the record is removed from the outbound queue and from the clerk's display screen at step 762. In this manner, the system does not endlessly attempt to send an instruction and thereby crowd the airwaves.

It should be noted that prior to placing the data packets in the outbound queue, at step 740, at least those data packets including image data are compressed so that the least number of data packets are transmitted to send an instruction or response thereto. For example, responses to quote requests, unsolicited quotes, and memos are compressed prior to being transmitted at step 742.

3. The Receive Routine

Figure 16:
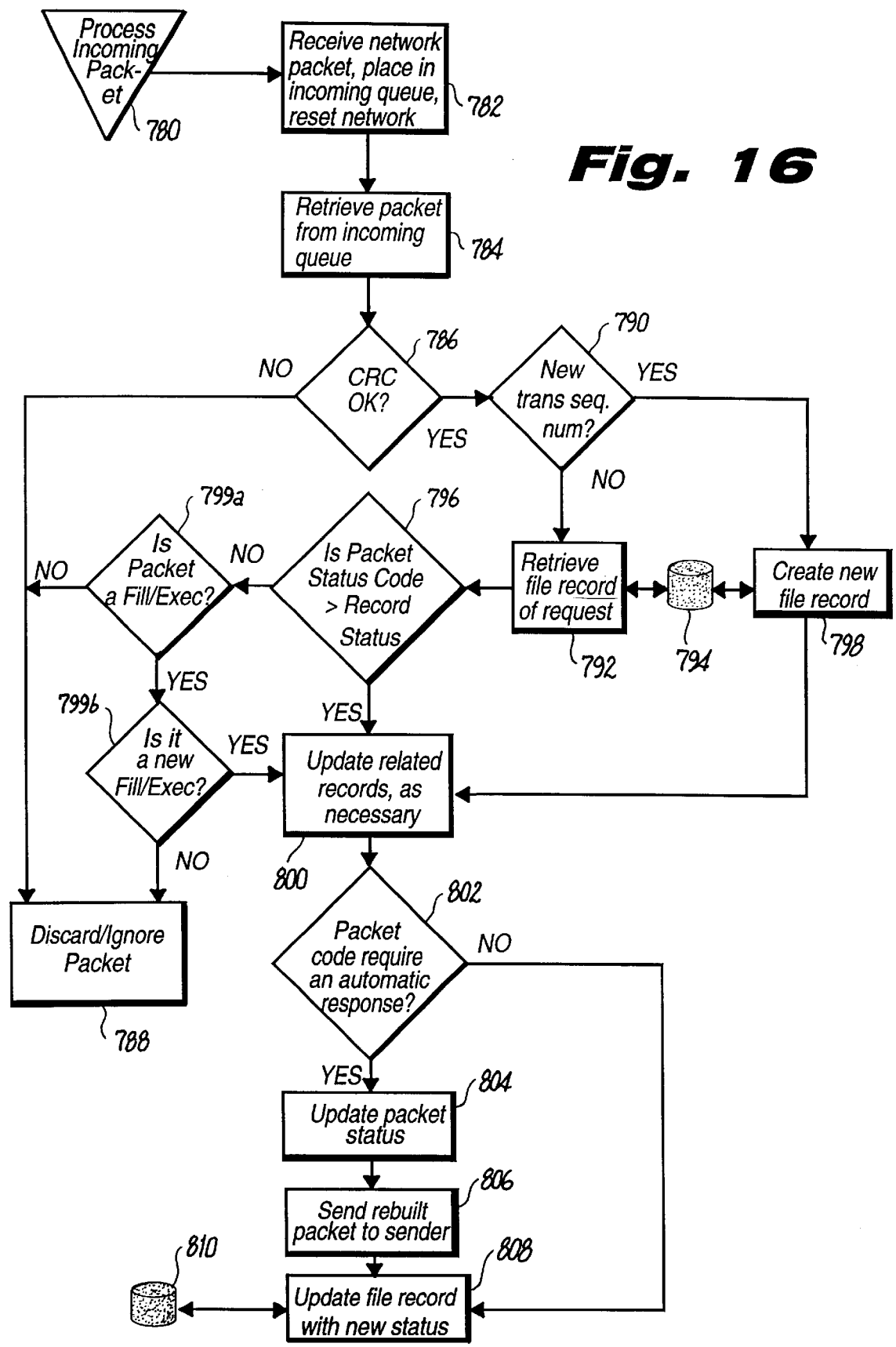
FIG. 16 is a flow diagram of a receive routine used to receive data packets that have been transmitted in accordance with a preferred embodiment of the present invention.

Like the send routine, all data packets that are received, either from the BS or the HHD, are handled by the receive routine illustrated in FIG. 16. In FIG. 16, the incoming packets to be processed that are received at 780 are, for example, the packets transmitted at step 742 in FIG. 15. At step 782, received packets are examined to determine whether or not the packets contain the address of the receiving device. If the packet is addressed for that receiving device, the packet is placed in an incoming packet queue, and a network received bit is reset so that the Proxim hardware, used in the above described embodiment, knows that the data packet has been handled. This is a lower level process to which the present invention is not directed.

At step 784, the received data packet is retrieved from the incoming packet queue and analyzed to determine how it is to be processed and which related records need to be updated. First, a cycle redundancy check ("CRC") is performed at step 786 on the received data packet to ensure that the data packet has arrived without error. If there are any mismatches, then the data packet is discarded, as at step 788.

Otherwise, the sequence number within the header of the data packet is examined at step 790 to determine whether it is a new sequence number (and therefore a new instruction) or a known one. This is accomplished by examining at least the transaction type for the transaction sequence number, and perhaps the related sequence numbers for that type, such as the fill sequence and/or execution sequence for received data packets of transaction type "E" (execution).

If the transaction sequence number is known, then the file record for that instruction is retrieved at step 792 from a storage area 794 (illustrated as a magnetic storage device, but the storage area could equally be a computer readable memory containing the data that corresponds to that transaction sequence number in a data structure) and further examined at step 796 to determine whether the subtype of the data packet retrieved from the incoming queue at step 784 has a hierarchically greater volley code than the retrieved record of the same transaction sequence number. This step ensures that repeat transmissions, as performed at steps 750 and 742 are ignored, whereas echoes and further responses such as execution reports and quotes are processed. Thus, if the subtype of the data packet retrieved from the incoming queue reveals that it is a repeat transmission of an already received data packet, then the duplicate data packet is ignored at step 788, after it is determined that the data packet is not an "execution" type transaction, at step 799a. In the event that the data packet examined at step 799a is an execution, then it will have data in the fill and/or execution sequence number fields that must be examined at step 799b before the data packet is discarded as a duplicate. This is because the transaction sequence number of an order and the execution against that order is the same, and therefore the fill and execution sequence numbers provide a vehicle to differentiate many executions against a single order. Accordingly, if it is determined either from the subtype of the data packet retrieved from the incoming queue or from its fill and/or execution sequence number fields that the data packet is a repeat transmission of an already received data packet, then the duplicate data packet is ignored at step 788. Otherwise the packet is processed as described below.

If the sequence number of the data packet retrieved from the incoming queue at step 784 is not known, then a new record file is created at step 798 and related records are updated as necessary at step 800. On the other hand, for example, if the incoming data packet (such as from the HHD) was of type execution "E" containing executions against an order, it will have a known transaction sequence number, yet its fill and/or execution sequence numbers must be associated with the order against which the execution was made so that the leaves can be amended to reflect the execution, as accomplished at step 800. In other words, the disposition of this type of data packet further involves the comparisons at steps 799a, 799b, as described above.

As used herein, the "sequence number" refers to the transaction sequence number for quotes, memos, and orders. In the case of executions, the sequence number refers to the (1) transaction sequence number, (2) fill sequence number, and (3) execution sequence number. The transaction, fill, and execution sequence numbers appear as separate variables in the data structure; however, a single sequence number can readily distinguish each quote, memo, or order from another in this group, as well as distinguish an execution from a quote or memo. The fill sequence number and execution sequence number in the data structure above are important to establishing the many-to-one heirarchical relationship of an execution data packet to an order data packet.

Once the data packet has been identified as intended for a particular device, and distinguished from other known data packets, the receive routine then determines what must be done in response to the newly received data packet. At step 802, the subtype is examined to determine whether an automatic response is required. If so, then the data packet status is transformed or altered to an updated code, for example, from "S" to "R," "A" to "*," etc., at step 804. The resulting data packet is echoed to the sender at step 806. Essentially, this is a call to the send routine of FIG. 15, as described above. The file record for this instruction is updated with the new stage or status of the instruction at step 808 and sent to storage at 810. If no automatic response is required, then the file record for this instruction is updated with the present status of the instruction at step 808 and sent to storage at 810, without invoking the send routine.

4. Operation Of Handheld Device

Figure 17:
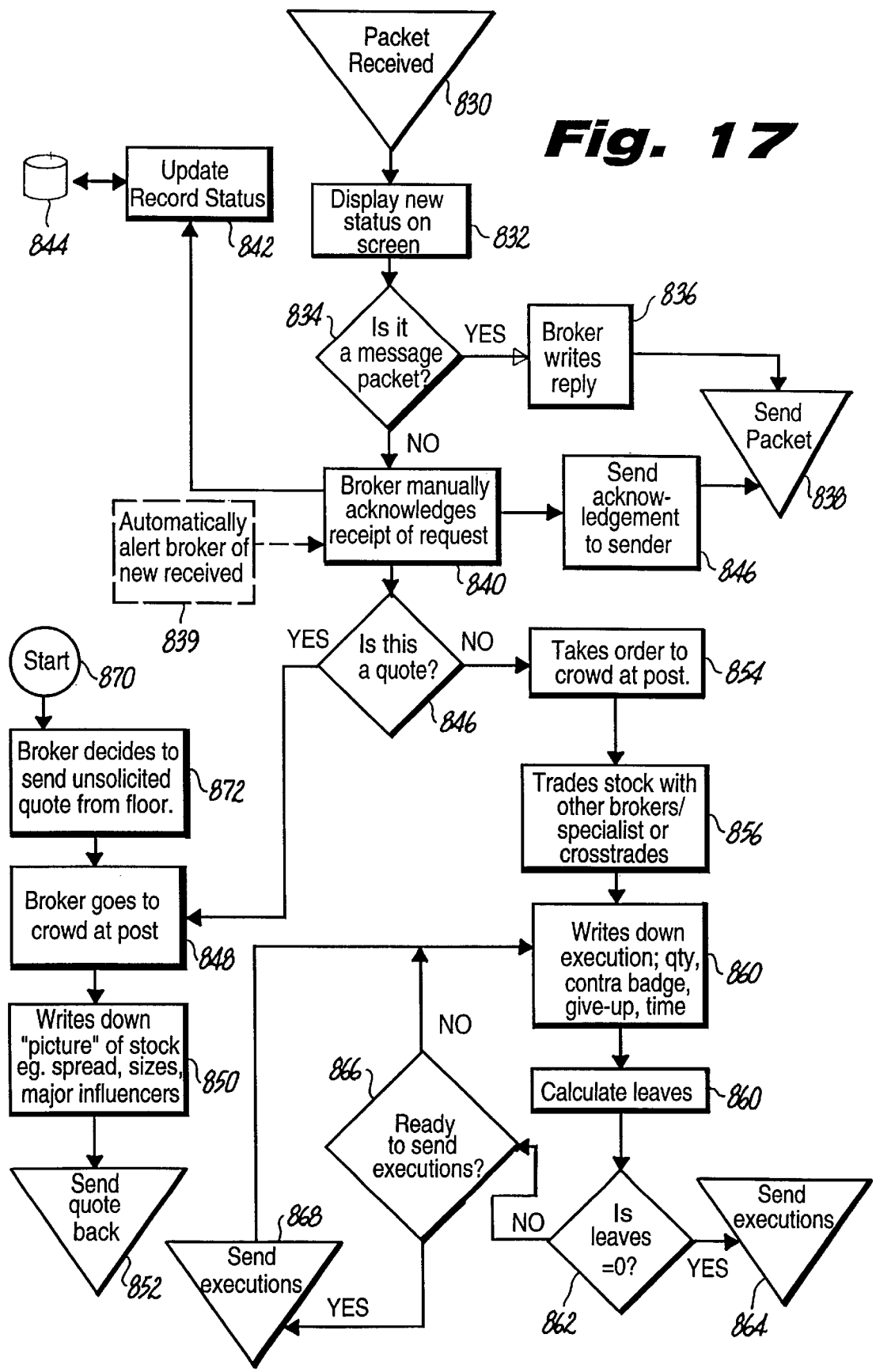
FIG. 17 is a flow diagram of the actions that may be taken at a handheld device programmed in accordance with a preferred embodiment of the present invention.

In FIG. 17, the operation of the HHD is described.

Data packets such as those that are received according to the receive routine of FIG. 16 are presented to the handheld device at 830. Step 830 represents the receive routine steps 780–810. The handheld device displays the new instruction or updated status of the previous instruction on the display screen 420 of FIG. 7 at step 832. The instruction may be a message, a quote request, or an order. The receipt of a message is indicated by blinking or inverting the text/background display of memo button 440. The receipt of a quote request is indicated by a new listing in the quote list 424, with a volley code of "S" or "R." The receipt of an order is indicated by listing the received order in the order list 430.

If the instruction is a message, as determined at step 834, then the floor broker writes his or her reply at step 836 and causes the packet to be sent at step 838 by calling the send routine of FIG. 15. If the instruction is not a message, a manual acknowledgement of the instruction is required. This is because the device that sends a quote request or an order, once having received the echo signal, awaits an acknowledgement that the recipient has seen the instruction, as displayed on the HHD, and awaits the quote or execution in response to the instruction. Hence, the floor broker manually acknowledges receipt of the data packet at step 840, which causes the file record for that instruction to be updated at step 842 and the updated record is stored, as at 844. A data packet is constructed to advise the sender of the instruction of the manual acknowledgement, as at step 846. This data packet is, according to the preferred embodiment, a transformation or alteration of the received data packet wherein the subtype volley code has been changed, and the data packet is sent by the send routine of FIG. 15, at step 838.

If within a predetermined period of time, the floor broker does not manually acknowledge receipt of a packet that requires manual acknowledgement, for example an acknowledge code "A" in response to an "R" code, then the BS may automatically alert the broker that a received message is indicated on the display screen, by transmitting an alert message. This may be accomplished by beeping the floor broker or by calling him or her on a cellular telephone, as shown in phantom at step 839. This step is shown in phantom because it represents an action that takes place remote to the HHD.

The process flow is such that a determination is made at step 847 whether the instruction is a quote request or an order. If the instruction is a quote request, then the floor broker goes to the post where that particular security is traded (at step 848) and writes the quote information at step 850, including the color or flavor of the market, as previously described, thereby constructing a data packet with image data for sending to the originator of the quote request. The response is sent as type/subtype "QQ" at step 852, by calling the send routine of FIG. 15.

On the other hand, if the instruction is an order, then the floor broker takes the order to the post where that particular security is traded at step 854 and either trades the stock with other brokers or the specialist, or cross trades the order with an order in his or her electronic deck, as displayed on his or her handheld device (step 856). The executions are entered into the handheld device at step 858, and the remaining quantity or leaves that must be traded to fill the order is calculated at step 860. If the leaves are zero, as determined at step 862, then the executions are sent at step 864 by calling the send routine of FIG. 15. Otherwise, if the floor broker is ready to send the partial execution(s), he or she may do so at steps 866, 868, and then continue to trade at step 856 until the leaves are zero, or may simply continue to trade at step 856 until he or she has a moment to send the executions, as when the trading activity in the crowd subsides.

Further, the floor broker may decide that there is activity in the trading crowd that would be important to his or her booth clerk or the investors. In anticipation of a quote request, at 870, the floor broker may begin the process without manually acknowledging any incoming instruction from a remote device, by deciding that there is information to send, at step 872. The broker may go to the post, as at 848, or may already be there. The broker records the information and creates a data packet, as at step 850, and sends the constructed data packet at step 852.

5. Operation Of Base Station

Figure 18:
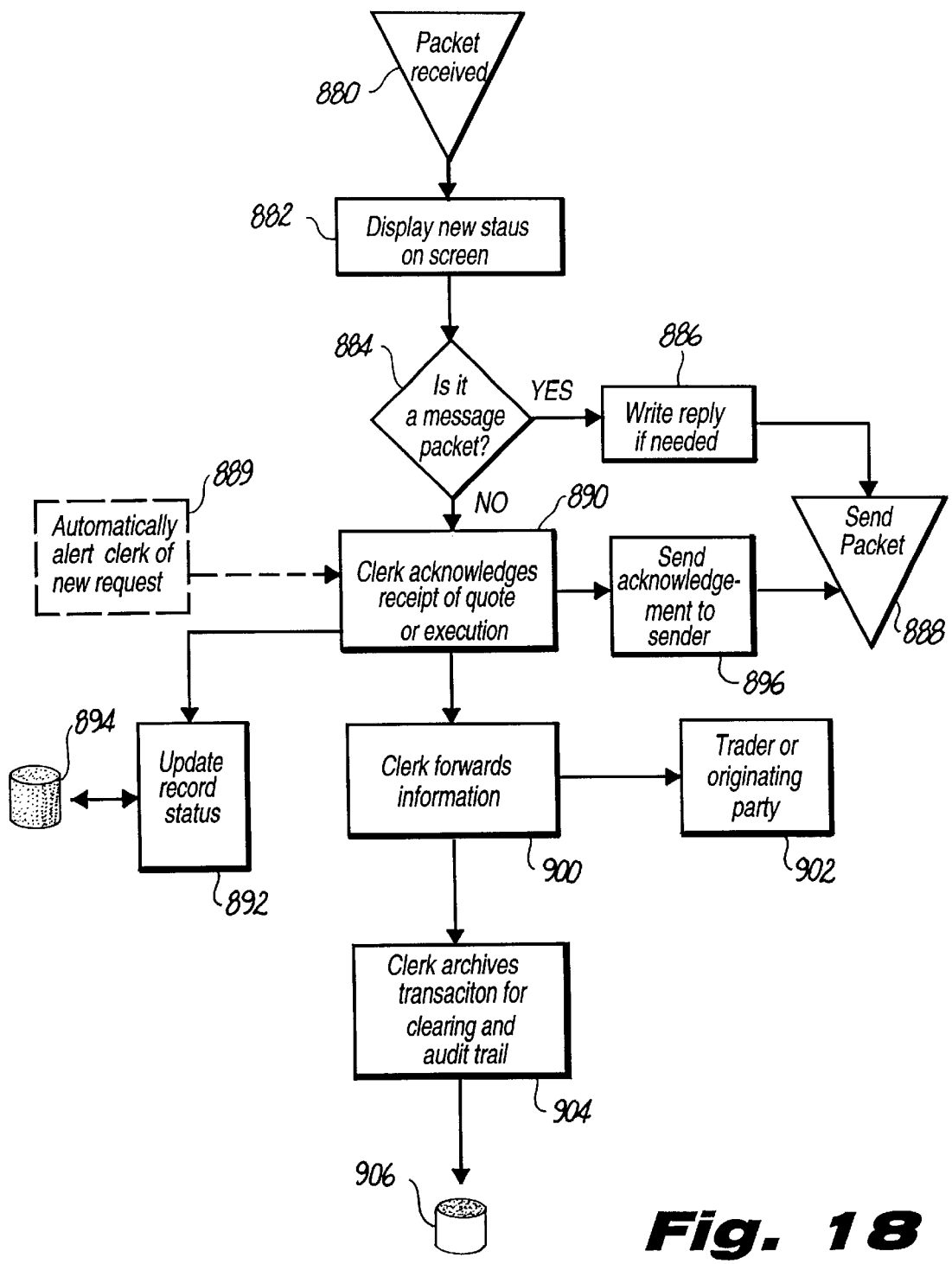
FIG. 18 is a flow diagram of the actions that may be taken at a base station programmed in accordance with a preferred embodiment of the present invention.

In FIG. 18, the operation of the BS is described.

Data packets, such as those that are received according to the receive routine of FIG. 16, are presented to the base station at 880. Step 880 represents the receive routine steps 780–810. The base station displays the new instruction or updated status of the previous instruction on the management display screen 300 of FIG. 1, at step 882. The instruction may be a message, a quote, or an execution. A received message is displayed in the image box 338, and may be cleared by touching the screen with an input device. Incoming quotes are also displayed in the image box 338, unless there is already an image being displayed. In the latter case, the incoming quote is displayed by pressing the four quotes button 340 which calls up the four quotes screen 406 of FIG. 2. Received executions are displayed in the report box 342 of the management display screen 300.

If the instruction is a message, as determined at step 884, then the clerk or other base station operator writes his or her reply at step 886 and causes the packet to be sent at step 888 by calling the send routine of FIG. 15. If the instruction is not a message, a manual acknowledgement is required, as previously described. Manual acknowledgement of the receipt of the data packet is performed at step 890, which causes the file record for that instruction to be updated at step 892 and the updated record to be stored, as at 894. A data packet is constructed to advise the sender of the instruction of the manual acknowledgement, as at step 896. This data packet is preferably a transformed or altered data packet as compared to the received data packet, wherein the subtype volley code is changed. The data packet is then sent by the send routine of FIG. 15, at step 888. If a manual acknowledgement is not detected within a predetermined period of time, for example an acknowledgement of the transmission of an unsolicited quote, then the HHD may automatically alert the clerk that a message has been received at the BS, which the clerk has not physically acknowledged, by transmitting an alert message by beeper or telephone, as shown in phantom at step 889. This step is shown in phantom because it represents an action that takes place remote to the BS.

The information in the received data packet is then forwarded at step 900, for example to the investor or originating party to the transaction at step 902, and to an archive for clearing and audit purposes at step 904. The data packet itself is stored at 906.

G. Modifications And Embellishments

While the foregoing discussion generally refers to the booth clerk as entering instructions and selecting floor brokers to handle the instructions, the invention is not so limited. Any person provided with a computer adapted to allow data entry, regardless of whether such person is situated at the physical exchange or remote to the exchange, may enter this data and select a floor broker. It being understood that the data entry and management functions of the booth clerk, as described herein, may be implemented by persons of other job descriptions, within the spirit of the invention.

While the quote and report entry screens of FIGS. 8 and 9 and the unsolicited quote entry screen of FIG. 11 have been described as functioning, in part, to transmit quotations, execution reports, and unsolicited quotes, this function can be achieved in other manners, as from another screen, as understood by those skilled in the art.

All storage in this specification may be magnetic or optical based storage media, or semiconductor memory elements such as RAM, DRAM, or SRAM, as understood by those skilled in the art.

From the foregoing description, it will be clear that the present invention may be embodied in other specific forms without departing from the spirit or essential characteristics thereof. Thus, for example, while the examples discussed above have described with respect to particular display screens and entry forms, in its broadest aspects, the invention is not concerned with data input, although particular methods of inputing data are believed to be inventive, as indicated by the appended claims. Thus, any means to input the instruction is contemplated to be within the scope of the invention. The presently disclosed embodiment is therefore to be considered in all respects as illustrative and not restrictive, the scope of the invention being indicated by the appended claims, and not limited to the foregoing description.

We claim:

1. A method for executing a cross-trade effected by a particular one of a plurality of floor brokers, each of the plurality of floor brokers having a computer that receives and transmits in a wireless manner, comprising the steps for the particular floor broker of:

receiving a transmission at a computer carried by the floor broker which represents a sell order for execution, the sell order concerning an instrument and including a first set of terms;

receiving a transmission at the computer carried by the floor broker which represents a buy order for execution, the buy order concerning the instrument and having a second set of terms which is compatible with the first set of terms;

permitting the floor broker to manually cross at least a portion of the buy order with the sell order using the computer so as to define a match between the portion of the buy order with the sell order; and selectively transmitting to a remote computer the crossed out portion of the buy and sell orders in response to the permitting step, whereby a cross-trade is executed of the matched portion of the buy order with the sell order and reported to the remote computer and executed.

2. The method as in claim 1, automatically time stamping the crossed portion of the buy and sell orders prior to the transmitting step.

3. The method as in claim 1, wherein the transmitting cross-trade identifies the buy order and the sell order.

4. The method as in claim 1, wherein the transmitting cross-trade is a trade report.

5. The method as in claim 4, including the additional step of automatically including the first set of terms of the buy order and the second set of terms of the sell order into the trade report.

6. The method as in claim 1, including the additional step of permitting the floor broker to edit the crossed portion of the buy and sell orders prior to the transmitting step.

7. The method as in claim 1, including the additional step of permitting the floor broker to attach a memo to the crossed portion of the buy and sell orders prior to the transmitting step, the memo being transmitted with the crossed portion of the buy and sell orders.

8. The method as in claim 1, wherein the first set of terms includes a first quantity of shares to be purchased and the second set of terms includes a second quantity of shares to be sold, the method including the additional step of automatically updating, at the computer carried by the floor broker and in response to the transmitting step, a quantity of shares still required to be purchased, sold, or both by subtracting the quantity of shares being crossed from the first and second quantity of shares to define leaves for the respective buy and sell orders.

9. The method as in claim 8, wherein the leaves are transmitted with the crossed portion of the buy and sell orders to the remote computer.

10. The method as in claim 1, wherein the permitting step includes the step of entering the crossed portion of the buy and sell orders at the computer carried by the floor broker.

11. The method as in claim 10, wherein the step of entering comprises:

touching a display screen of the computer carried by the floor broker at a location where one of the buy order and the sell order is presently being displayed; and touching the display screen of the computer carried by the floor broker at a location where the other of the buy order and the sell order is presently being displayed.

12. The method as in claim 11, wherein the transmitted cross-trade identifies the buy order and the sell order.

13. The method as in claim 11, automatically time stamping the crossed portion of the buy and sell orders prior to the transmitting step.

14. The method as in claim 11, wherein the transmitted cross-trade is a trade report.

15. The method as in claim 14, including the additional step of automatically including the first set of terms of the buy order and the second set of terms of the sell order into the trade report.

16. The method as in claim 11, including the additional step of permitting the floor broker to edit the crossed portion of the buy and sell orders prior to the transmitting step.

17. The method as in claim 11, including the additional step of permitting the floor broker to attach a memo to the crossed portion of the buy and sell orders prior to the transmitting step, the memo being transmitted with the crossed portion of the buy and sell orders.

18. The method as in claim 11, wherein the first set of terms includes a first quantity of shares to be purchased and the second set of terms includes a second quantity of shares to be sold, the method including the additional step of automatically updating, at the computer carried by the floor broker and in response to the transmitting step, a quantity of shares still required to be purchased, sold, or both by subtracting the quantity of shares being crossed from the first and second quantity of shares to define leaves for the respective buy and sell orders.

19. The method as in claim 18, wherein the updated leaves are transmitted with the crossed portion of the buy and sell orders to the remote computer.

20. The method as in claim 1, wherein the first set of terms includes a first quantity of shares to be purchased and the second set of terms includes a second quantity of shares to be sold, the method including the additional step of automatically updating, at the computer carried by the floor broker and in response to the transmitting step, a quantity of shares still required to be either purchased or sold by subtracting the larger of the first and second quantities of shares from the smaller of the first and second number of shares to define leaves.

* * * * *

UNITED STATES PATENT AND TRADEMARK OFFICE
CERTIFICATE OF CORRECTION

PATENT NO. : 6,768,981 B2
DATED : July 27, 2004
INVENTOR(S) : L. Thomas Patterson Jr. et al.

It is certified that error appears in the above-identified patent and that said Letters Patent is hereby corrected as shown below:

Column 33,
Line 64, delete "out".

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,768,981 B2
DATED : July 27, 2004
INVENTOR(S) : L. Thomas Patterson, Jr. et al.

It is certified that error appears in the above-identified patent and that said Letters Patent is hereby corrected as shown below:

Column 34,
Lines 4 and 6, delete "transmitting" and insert therefor -- transmitted --.

Signed and Sealed this

Third Day of May, 2005

JON W. DUDAS
*Director of the United States Patent and Trademark Office*